(12) United States Patent
Morrison et al.

(10) Patent No.: US 7,573,395 B2
(45) Date of Patent: Aug. 11, 2009

(54) SYSTEM AND METHOD FOR MANAGING THE DISPENSATION OF A BULK PRODUCT

(75) Inventors: Christopher S. Morrison, Scottsdale, AZ (US); Adam A. Studnicki, Scottsdale, AZ (US)

(73) Assignee: SGS Technologies, LLC, Tempe, AZ (US)

( * ) Notice: Subject to any disclaimer, the term of this patent is extended or adjusted under 35 U.S.C. 154(b) by 0 days.

(21) Appl. No.: 10/906,634

(22) Filed: Feb. 28, 2005

(65) Prior Publication Data

US 2005/0197738 A1 Sep. 8, 2005

Related U.S. Application Data

(60) Provisional application No. 60/551,191, filed on Mar. 8, 2004, provisional application No. 60/650,307, filed on Feb. 3, 2005.

(51) Int. Cl.
G08B 21/00 (2006.01)
(52) U.S. Cl. .................. 340/689; 340/572.1; 340/572.8
(58) Field of Classification Search ................. 340/689, 340/572.1, 572.4, 572.8, 573.1, 10.1, 10.34, 340/10.51; 235/380, 385, 375; 222/23, 52, 222/641
See application file for complete search history.

(56) References Cited

U.S. PATENT DOCUMENTS

| | | | |
|---|---|---|---|
| 2,936,163 A | 5/1960 | Foster | |
| 3,170,597 A | 2/1965 | Reichenberger | |
| 3,257,034 A | 6/1966 | Dumm, III | |
| 3,428,218 A | 2/1969 | Coja | |
| 3,599,833 A | 8/1971 | Reichenberger | |
| 3,688,947 A | 9/1972 | Reichenberger | |
| 3,863,724 A | 2/1975 | Dalia, Jr. | |
| 3,920,149 A | 11/1975 | Fortino et al. | |
| 4,162,028 A | 7/1979 | Reichenberger | |
| 4,276,999 A | 7/1981 | Reichenberger | |
| 4,278,186 A | 7/1981 | Williamson | |
| 4,411,351 A | 10/1983 | Lowder et al. | |
| RE31,434 E | 11/1983 | Reilly | |
| 4,433,795 A | 2/1984 | Maiefski et al. | |
| 4,530,067 A | 7/1985 | Dorr | |
| 4,563,739 A | 1/1986 | Gerpheide et al. | |
| 4,658,357 A | 4/1987 | Carroll et al. | |
| 4,660,742 A | 4/1987 | Ozdemir | |
| 4,736,871 A | 4/1988 | Luciani et al. | |

(Continued)

*Primary Examiner*—Van T. Trieu
(74) *Attorney, Agent, or Firm*—Lowell W. Gresham; Jordan M. Meschkow; Gouri G. Nair

(57) ABSTRACT

A premises (20) is equipped with a plurality of containers (26) in which are stored bulk products (56) that are dispensed from the containers (26) for individual transactions. The containers (26) are equipped with asset tags (48) that monitor the dispensation of products (56). Event records (96) are electronically communicated from the asset tags (48) to a host (46) for processing. A tag event process (198) evaluates the event records (96) and calculates actual dispensation rates (224) that self-calibrate for a number of potential dispensation variances. The tag event process (198) detects when a container (26) becomes empty (68) and then performs a reconciliation (266) for the container (26). The process (198) also detects when inventory usage data is incomplete, whether by failure to receive communications or from missing a single event record (96), and causes a warning to be presented so that an audit may be performed.

43 Claims, 8 Drawing Sheets

U.S. PATENT DOCUMENTS

| | | |
|---|---|---|
| 4,891,755 A | 1/1990 | Asher |
| 4,961,533 A | 10/1990 | Teller et al. |
| 4,997,012 A | 3/1991 | Kuziw |
| 5,007,560 A | 4/1991 | Sassak |
| 5,255,819 A | 10/1993 | Peckels |
| 5,295,611 A | 3/1994 | Simard |
| 5,379,916 A | 1/1995 | Martindale et al. |
| 5,454,406 A * | 10/1995 | Rejret et al. .................... 141/1 |
| 5,507,411 A | 4/1996 | Peckels |
| 5,511,694 A | 4/1996 | Rohm |
| 5,603,430 A | 2/1997 | Loehrke et al. |
| 5,659,482 A | 8/1997 | Warn et al. |
| 5,664,113 A | 9/1997 | Worger et al. |
| 5,682,142 A | 10/1997 | Loosmore et al. |
| D386,350 S | 11/1997 | Mogadam |
| 5,702,032 A | 12/1997 | Loehrke |
| 5,731,981 A | 3/1998 | Simard |
| 5,745,036 A | 4/1998 | Clare |
| 5,774,865 A | 6/1998 | Glynn |
| 5,838,798 A | 11/1998 | Stevens, III |
| 5,930,766 A | 7/1999 | Gibb |
| 5,931,343 A * | 8/1999 | Topar et al. .................... 222/56 |
| 5,986,219 A | 11/1999 | Carroll et al. |
| 5,988,859 A | 11/1999 | Kirk |
| 6,016,476 A | 1/2000 | Maes et al. |
| 6,036,055 A | 3/2000 | Mogadam et al. |
| 6,082,587 A | 7/2000 | Martindale et al. |
| 6,092,726 A | 7/2000 | Toussant et al. |
| 6,298,972 B1 * | 10/2001 | Tedesco et al. .............. 194/217 |
| 6,321,934 B1 | 11/2001 | Immel |
| 6,354,468 B1 | 3/2002 | Riek |
| 6,409,046 B1 | 6/2002 | Peckels |
| 6,427,871 B1 | 8/2002 | Suero |
| 6,450,406 B2 | 9/2002 | Brown |
| 6,504,481 B2 | 1/2003 | Teller |
| 6,616,037 B2 | 9/2003 | Grimm et al. |
| 6,718,311 B1 | 4/2004 | Suo-Anttila |
| 2001/0007982 A1 | 7/2001 | Brown |
| 2002/0035524 A1 | 3/2002 | Husslage |
| 2003/0034392 A1 | 2/2003 | Grimm et al. |
| 2003/0055589 A1 | 3/2003 | Mogadam |
| 2003/0071725 A1 | 4/2003 | Teller |
| 2004/0124192 A1 | 7/2004 | Teller |
| 2004/0210405 A1 | 10/2004 | Mogadam |
| 2004/0232227 A1 * | 11/2004 | Kusakawa ................... 235/381 |
| 2005/0092389 A1 * | 5/2005 | Mazur et al. ................ 141/100 |

* cited by examiner

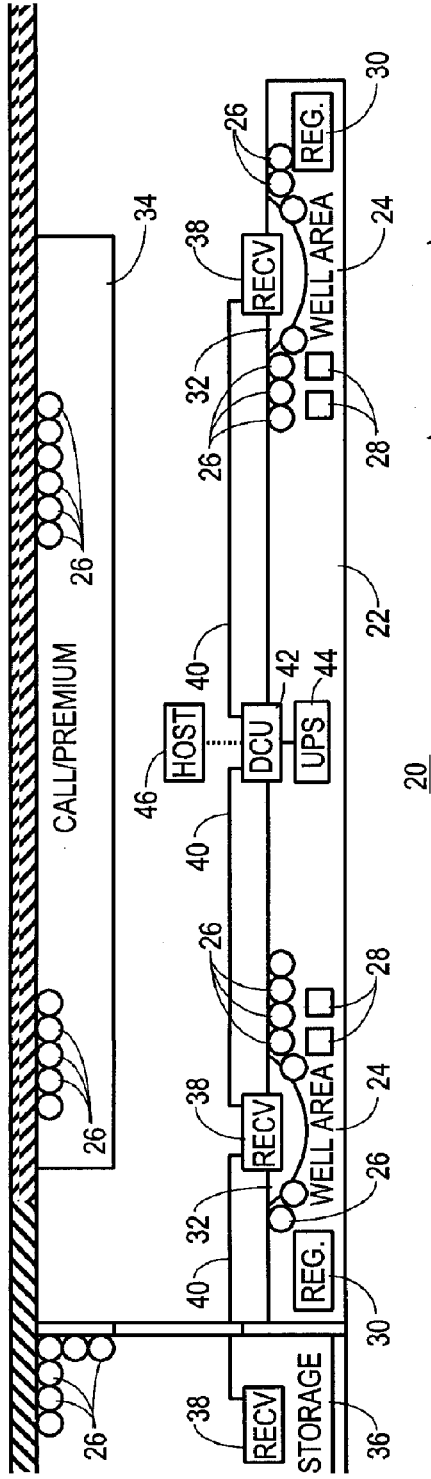
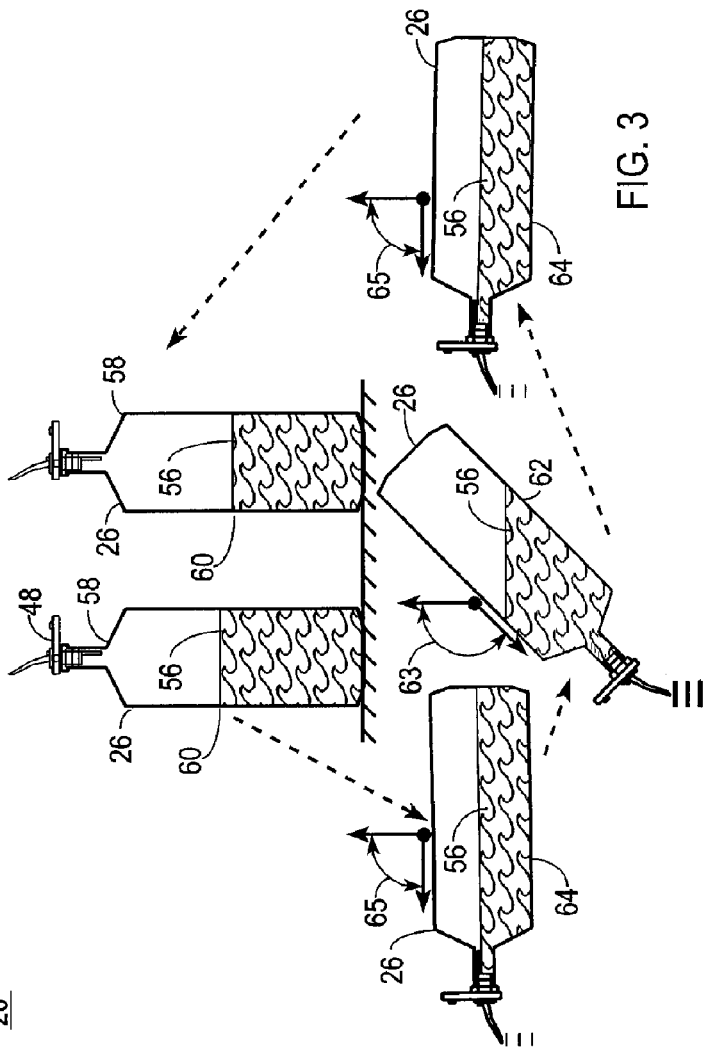
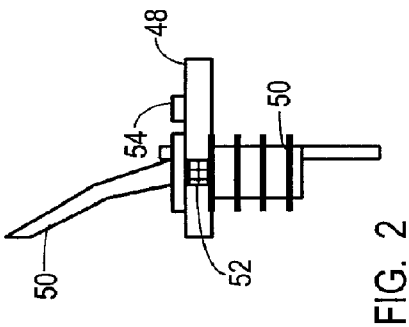

FIG. 10

TAG / CONTAINER TABLE (216)

| TAG ID | LAST XMIT EVENT | LAST PROD. ID | INITIAL AMOUNT | COST | ACTUAL RATE-90° | ACTUAL RATE-135° | EXPECTED RATE-90° | EXPECTED RATE-135° | IMAGE ID | CONT. PARAM. | ACCUM. DURATION-90° | ACCUM. DURATION-135° |
|---|---|---|---|---|---|---|---|---|---|---|---|---|
| 90 | 108 | 218 | 222 | 223 | 224' | 224" | 226 | 226' | 226" | 227 | 228 | |
| ... | ... | ... | ... | ... | ... | ... | ... | ... | ... | ... | ... | ... |
| | 220 | | | | | | | | | | 221' | 221" |

FIG. 11

TRANSACTION TABLE (232)

| TRANS. ID | TAG ID | PRODUCT ID | T.O.D. | 90° DURATION | 135° DURATION | ACTUAL AMOUNT | COST | EXPECTED AMOUNT | SALES PRICE |
|---|---|---|---|---|---|---|---|---|---|
| 234 | 90 | 218 | 236 | 146 | 148 | 238 | | 240 | 242 |
| ... | ... | ... | ... | ... | ... | ... | ... | ... | ... |

246
| PRICE SCHEDULE | | | | |
|---|---|---|---|---|
| PRODUCT ID | T.O.D. | EXPECTED RANGE | UI CODE | PRICE |
| ⋮ | ⋮ | ⋮ | ⋮ | ⋮ |

↖218  ↖248  ↖240'  ↖114  ↖250

252
| SWITCH TABLE | | | |
|---|---|---|---|
| TAG ID | EVENT ID | T.O.D. | SWITCH TYPE & ID |
| ⋮ | ⋮ | ⋮ | ⋮ |

↖90  ↖108  ↖236  ↖112
              ↖114

SYSTEM AND METHOD FOR MANAGING THE DISPENSATION OF A BULK PRODUCT

RELATED INVENTION

The present invention claims benefit under 35 U.S.C. 119(e) to "Inventory Systems and Methods," U.S. Provisional Patent Application Ser. No. 60/551,191, filed 8 Mar. 2004, and to "Inventory Systems and Methods," U.S. Provisional Patent Application Ser. No. 60/650,307, filed 3 Feb. 2005, both of which are incorporated by reference herein.

TECHNICAL FIELD OF THE INVENTION

The present invention relates generally to systems and methods for tracking and processing inventory and financial transactions for bulk products.

BACKGROUND OF THE INVENTION

A variety of businesses, enterprises, departments within larger companies, and other forms of organizations sell, lease or otherwise provide products to customers. In order to effectively manage the organization, it is desirable to gather knowledge about how much of which products are being provided during different periods. With this knowledge, replacement products may be ordered at the right time, product mix may be balanced to better achieve the goals of the organization, product pricing may be adjusted to better achieve the goals of the organization, reasons for inventory shrinkage may be rapidly identified and corrected, and the like. But the knowledge should be accurate, complete, and in a form that is readily understood so that good management decisions will result.

It is also desirable, and has been a long-standing practice, to gather knowledge about individual financial transactions that an organization engages in while providing products to customers. And, at least when products are bar-coded or otherwise individually identifiable, inventory usage knowledge has been simultaneously obtained and integrated with financial knowledge. This type of knowledge base is collected in a manner that allows it to be reasonably accurate and complete so that it provides an excellent management tool for minimizing losses, maximizing profits, and otherwise balancing the daily operations of an organization to best achieve the goals of the organization.

But when products are dispensed in bulk for individual transactions, management has traditionally had to suffer with extremely poor tools on which to base management decisions. Bulk products are provided to customers without packaging, labels, or other identifiers that convey the product's identity and quantity in a way that can be easily captured in the course of a transaction. An organization that dispenses beverages for on-site consumption, such as a bar, tavern, or restaurant, is one example of an organization that dispenses products in bulk for individual transactions. Bars typically sell alcoholic drinks in serving sizes of less than an entire container, or bottle, by dispensing alcohol from the bottle into a glass for on-site consumption by a customer.

In addition to difficulties associated with capturing inventory usage data for individual transactions, organizations that dispense bulk products in individual transactions face a more complex range of possible causes for variances between actual results and desired results or goals.

Following the example of a bar, and in particular a bar that free-pours drinks, variations generally occur both in inventory usage and in revenue collections. "Free-pouring" refers to a server, referred to herein as a bartender, pouring a drink from a bottle that does not have a pour spout, or from a bottle with a pour spout that does not control the amount of the drink that is poured. In a free-pouring establishment, the quantity of beverage dispensed for each drink is ultimately up to the bartender. With respect to inventory usage, there is variability in how accurately bartenders can free-pour specific volumes of drinks. Variability results because different pour spouts pour at significantly different pour rates. Still more variability results because the amount of product dispensed from a given pour spout will vary depending on the amount of liquid in the bottle, the viscosity of the liquid, the barometric pressure, the temperature, and the shape of the bottle. And still more variability results due to accidental overpouring or underpouring of drinks, intentional overpouring or underpouring of drinks, spillage, drink mistakes, and/or drink returns. For virtually every free-poured drink, the desired inventory usage (i.e., the intended amount of liquid a bartender's manager would want the bartender to dispense) is different than the actual inventory usage (i.e., the actual amount of liquid dispensed).

Desired revenue is the amount of money a bar's management intends to receive for a given transaction. Actual revenue is the amount of money that is actually received for a given transaction. With respect to revenue from individual transactions, variations between desired revenue and actual revenue may be caused from a variety of additional factors. For example, a bartender may accidentally or intentionally fail to charge a customer for a drink, accidentally or intentionally fail to ring up a drink even though a customer paid for the drink, accidentally or intentionally mischarge the customer for a drink, accidentally or intentionally collect the wrong amount of money for a drink, and/or accidentally or intentionally make an error in ringing up a drink.

As a result of the above discussed variations, actual inventory usage will invariably fail to correspond to actual revenue collections. Organizations typically use the term "shrinkage" to refer to this discrepancy. As a result, a number of prior art solutions have been presented in an effort to minimize the problems associated with the management and control of alcohol dispensation. The purpose of these solutions is to help bars control revenue, inventory, or both revenue and inventory.

Traditionally, bars have resorted to the occasional manual inventory procedure. Using this procedure, all opened and unopened bottles are visually examined and/or weighed to gain knowledge about the inventory. But this technique consumes so much time that it is performed only occasionally. Its occasional use causes this procedure to produce primarily stale data that merges distinct operational periods (quarters, months, weeks, days, shifts, happy hours, etc.). In even the most efficiently run bars, this procedure is still subject to large errors to the extent it is based on subjective human judgment to gauge amounts of product present in opened bottles and human labor to construct and tally inventory lists. Due to the poor quality of data obtained using this technique, it is of little value as a management tool.

A variety of higher-technology solutions have been proposed for use by bars to aid in capturing specific data describing inventory usage during individual transactions so as to provide better management tools. But such solutions have failed to adequately address all of a bar's needs. One example of such a solution is the incorporation of a point-of-sale (POS) system into a bar's operations. While POS systems provide many positive management tools, they are primarily revenue management tools that do not provide adequate tools for the management of bulk product inventory or for the reconciliation of revenue with bulk product inventory.

Some prior art systems attempt to address the problems of the variability inherent in free-pouring. One technique addresses dispensation control. In such systems devices are employed to control the amount of beverage dispensed for each transaction rather than rely upon the intentions and skill of the bartender in setting the proportions. One such system uses a spout that allows drinks to be poured only if the spout is placed in a magnetic actuator ring or collar. The actuator ring or collar is wired to a box that records the pouring of the drink. Another system uses a beverage gun. In this system, bottles are stored upside down in a tower-like structure. When the bartender presses a button on the beverage gun, the corresponding drink is run through pressurized lines and out of the beverage gun.

While these systems do a good job of collecting accurate data concerning the events about which data are collected, they are highly disadvantageous for marketing reasons alone. Such devices cause the organization to fail to meet marketing goals by causing the organization to fail to provide what the customer wants. Free-pouring is preferred by most customers, most bartenders, and most bars. The reason many people go to bars is for the experience. Free-pouring gives a bar more flexibility in pouring beverages. It also lets customers know that the serving sizes of their beverages are not being precisely controlled. Bar customers typically like to see their beverages free-poured, especially when they are ordering a more expensive drink. Bar customers do not like systems that electronically or mechanically control pour size because they know they have no chance of getting special treatment, such as an overpoured or custom-proportioned beverage for a good customer. Worse, they may think that the bar owner purposefully set the system to a smaller-than-average pour size in order to increase profits. Free-pouring is also preferred by bartenders because it is stylish, it allows them to pour with one hand, it allows them to engage in what is known as flair bartending (using showmanship, such a flipping bottles and glasses) and it gives them considerable added freedom and flexibility in serving beverages, especially mixed beverages. Free-pouring is almost a necessity in certain bar marketing concepts including, for example, neighborhood bars and upscale bars. Generally speaking, bars are very competitive businesses, and customers are more likely to drink at a bar where they can enjoy a better ambiance, better service, and a better overall experience, which includes free-poured beverages. The loss of goodwill and damage to a bar's image caused by these dispensation-control systems can be significant.

In addition, these dispensation-control systems are tremendously expensive to buy, to install, and to operate. They are also bulky and force bartenders to pour drinks only from the location where the hardware is installed. If the system breaks down, business may literally come to a standstill (which can be very costly, especially on a busy night). The magnetic-collar system requires the use of two hands and permits only one drink to be poured at a time. In either system, the cost is so great that bars are urged by financial considerations to use the system with only some of the bar's inventory, while relying entirely on manual techniques for the remaining inventory. Due to a lack of universal application within a bar, the resulting knowledge base tends to be incomplete. And, the magnetic-collar system is easily defeated by removing collars so that the collected data is likely to be even more incomplete.

Some prior art systems attempt to address the inventory management problems faced by bars. This class of systems includes the use of electronic tags, called "asset tags" herein, that are attached to bottles, typically at the bottle neck or at the bottom of the bottle. These electronic tags generally attempt to detect when the bottles to which they are attached are tilted more than 90° past their normal upright positions, to time the durations for which the bottles remain in their tilted orientations, and to report the tilting events to a data processing system.

But the prior art versions of such devices are entirely inadequate for these purposes. The data collected and processed by such systems do not accurately describe the inventory usage. And, such systems fail to detect and report when inaccurate data is likely being collected. Such systems also fail to provide feedback describing the performance of the bartender. For example, the prior art systems do not capture information describing the bartender's intentions with respect to a pour and/or fail to determine whether the bartender's actions were consistent with those intentions. And, the information presented by such systems tends not to be presented in a form that is quickly and easily related to the establishment's operations.

SUMMARY OF THE INVENTION

It is an advantage of the present invention that an improved system and method for managing the dispensation of a bulk product is provided.

Another advantage is that a system and method are provided which automatically collects reasonably accurate and complete inventory usage data along with data that characterizes the accuracy of the data being collected.

Another advantage is that a system and method are provided in which inventory usage data are integrated with revenue data.

Another advantage is that a system and method are provided in which system expense is held to a low level so that an organization is encouraged to collect inventory usage data for a large portion of its inventory.

Another advantage is that a system and method are provided in which situations are detected and flagged where a likelihood of incomplete and/or inaccurate data exists.

Another advantage is that a system and method are provided where performance feedback information is presented in connection with dispensations of bulk products.

At least a portion of these and/or other advantages are realized in one form by an improved system for managing the dispensation of a bulk product. The bulk product is dispensed from a container in which the bulk product is stored and from which the bulk product is dispensed by tilting the container away from an inactive orientation. An asset tag couples to the container. The asset tag has a first tilt sensor configured to detect an orientation for the container of greater than a first angle displaced from the inactive orientation. The asset tag has a second tilt sensor configured to detect an orientation for the container of greater than a second angle displaced from the inactive orientation. The second angle is greater than the first angle. The asset tag is configured to generate first data describing a duration the container spends at the orientation greater than the first angle and second data describing a duration the container spends at the orientation greater than the second angle. The asset tag is configured to electronically transmit the first and second data. A computer remotely located from the asset tag is configured to obtain the first and second data transmitted from the asset tag. The computer is configured to calculate a total amount of bulk product dispensed in response to the first and second data. An information-presentation system is in data communication with the computer. The information-presentation system is configured, in cooperation with the computer, to present information describing the total amount dispensed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows an exemplary layout of the premises managed by an organization where one embodiment of the present invention may be used;

FIG. 2 shows a side view of one embodiment of an asset tag that may be used in connection with the present invention;

FIG. 3 shows a sequence depicting the dispensing of a bulk product from a container;

FIG. 10 shows a tag/container table that depicts exemplary relationships between various data items used in the process of FIG. 9;

FIG. 11 shows a transaction table that depicts exemplary relationships between various data items used in the process of FIG. 9;

DETAILED DESCRIPTION OF THE PREFERRED EMBODIMENTS

Figure 4:
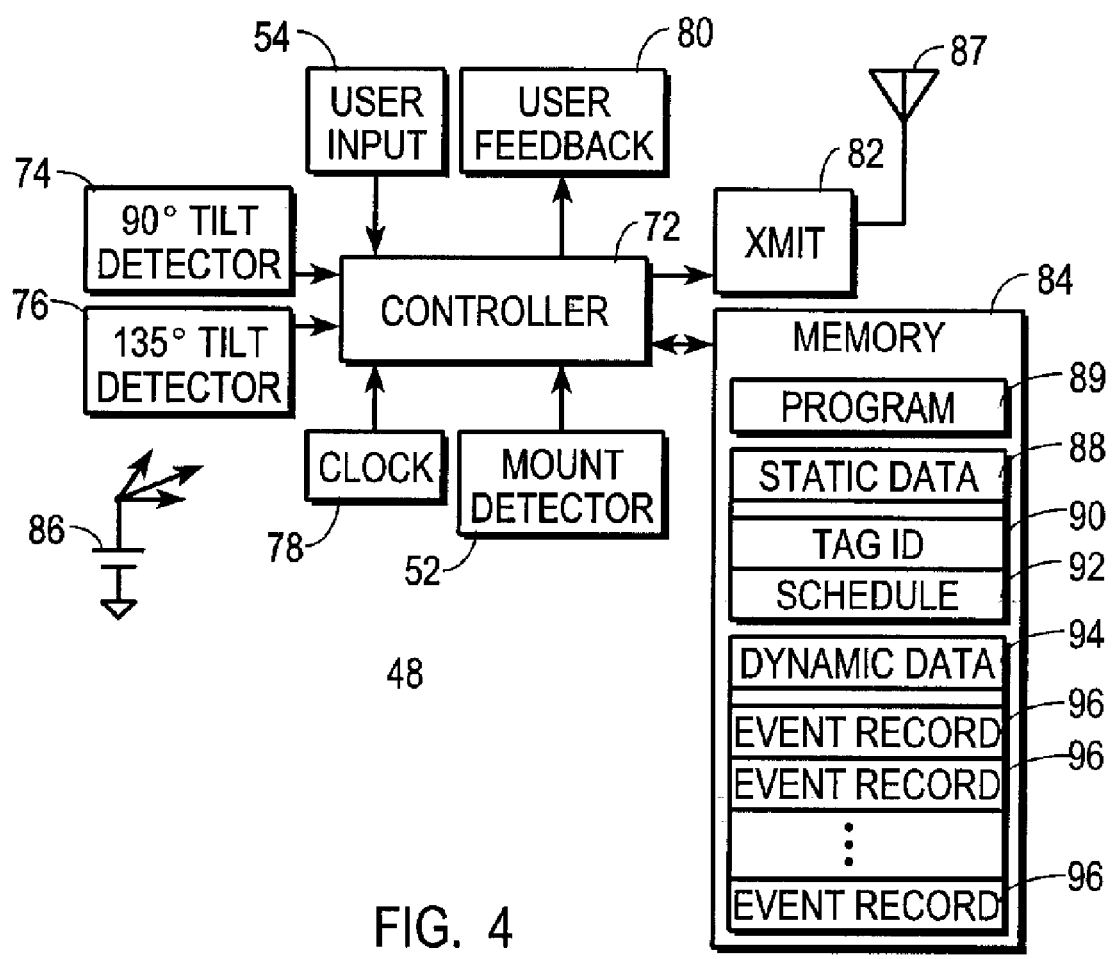
FIG. 4 shows a block diagram of one embodiment of an asset tag that may be used in connection with the present invention.

FIG. 1 shows an exemplary layout of a premises 20 managed by an organization where one embodiment of the present invention may be used. This embodiment and other embodiments discussed below are directed primarily to an establishment which serves alcoholic beverages intended for on-site consumption by its customers. But those skilled in the art will appreciate that the present invention is not limited to being used only in places where alcoholic beverages are provided but may be adapted for use by a variety of organizations that engage in providing bulk products.

Premises 20 occupies a predetermined area that includes a bar 22. Bar 22 in this exemplary layout includes a plurality of well areas 24 (two shown) from which drinks can be served. A plurality of bulk-product servers, referred to herein as bartenders, may simultaneously operate from well areas 24. Containers 26 of bulk product are located in or near well areas 24. In this example, containers 26 are likely to be in the form of bottles and the bulk product is likely to be an alcoholic beverage. In a typical example, a wide variety of different beverages will be present at premises 20 in a wide variety of containers 26. In addition, other dispensing devices, such as containers with tap handles 28 or other objects with tap handles 28, may be located in or near well areas 24. For the purposes of this description, tap handles 28 and other dispensing valves or objects that are associated with containers which hold bulk product are included within the meaning of a container 26. In the case of a tap handle 28, bulk product is dispensed from the container 26 and tap handle 28 when the orientation of the tap handle 28 is changed. Likewise, a register 30, such as a cash register, electronic cash register (ECR), point-of-sale (POS) system, or the like, and a sink 32 may be located in or near well areas 24. Registers 30 are where the actual revenue is stored for a period of time. Thus, well areas 24 may be characterized as being efficiently organized for the mixing and dispensation of beverages and for conducting financial transactions in connection therewith. But well areas 24 may not, and need not in accordance with one embodiment of the present invention, have excess space for the placement of electronic devices and may not have AC power outlets readily available for powering electronic devices.

Premises 20 in this exemplary layout also includes a back-bar area 34 which may be shared by all bartenders operating in premises 20. Back-bar area 34 may also be stocked with containers 26 in the form of bottles. But containers in back-bar area 34 might be used for making less common call or premium drinks, as opposed to the more common well drinks that might be made at well areas 24. And, premises 20 in this exemplary layout also includes a storage area 36 in which are stored still more containers 26. Of course, premises 20 is merely one example of a bar layout, and a vast number of variations from this layout may be accommodated by the present invention.

In the embodiment of premises 20 depicted in FIG. 1, containers 26, including other devices from which bulk product is dispensed, such as tap handles 28, are desirably equipped with asset tags. Desirably, all open containers 26 and other product dispensation devices in premises 20 are equipped with asset tags, but this is not a requirement of the present invention. An asset tag is one form of a computer that is configured to detect various events that it, and the container 26 or other device it is associated with, experience and is configured to electronically transmit data describing those events to one or more other computer devices. Asset tags are discussed in more detail below.

Receivers 38 represent another form of computer which may communicate with the asset tags. Receivers 38 may be located in well areas 24, back-bar 34, storage area 36, or anywhere else which might be convenient and proximate to where containers 26 and/or containers with tap handles 28 are used. In one embodiment, asset tags use a low power, wireless, radio frequency (RF) communication scheme to transmit their data, and a plurality of receivers 38 are distributed throughout premises 20 to improve the likelihood that at least one of receivers 38 will successfully receive these data.

In the embodiment of premises 20 depicted in FIG. 1, receivers 38 may include only the small amount of circuitry needed to communicate with asset tags. In particular, receivers 38 in this embodiment desirably omit power circuitry and receive DC power over a wired communication link 40 with a data collection unit (DCU) 42. And, communication link 40 may pass through receivers 38 in a daisy-chained fashion or share a common bus so that a number of receivers 38 may communicate with DCU 42 over a common set of wires.

In the preferred embodiment, DCU 42 is another form of computer, and is in data communication with one or more receivers 38 through link 40. DCU 42 is coupled to or includes an uninterruptible power source (UPS) 44 that includes a battery of sufficient size to power DCU 42 and receivers 38 for several weeks without using power from a public power distribution network. In this configuration, receivers 38 may be made in a water-resistant, small, low cost configuration that does not require the use of AC power in the crowded well areas 24 where receivers 38 are likely located.

In the FIG. 1 layout diagram, a host 46 is another form of computer. Host 46 is in data communication most directly with DCU 42, but also in data communication with receivers 38 through DCU 42 and with the asset tags through receivers 38 and DCU 42. In this embodiment, host 46 need not be permanently coupled to DCU 42 but may merely connect to DCU 42 on an as-needed basis from time-to-time. DCU 42 merely logs or collects data received from receivers 38 until host 46 can collect the data from DCU 42. FIG. 1 illustrates that a DCU 42 may support any number of receivers 38. Although not shown, any number of DCU's 42 may be supported by host 46.

While FIG. 1 depicts register 30 as being a separate device from host 46, DCU 42, and receivers 38, this is not a requirement. Register 30 may very well be yet another form of computer, or register 30 may alternatively be integrated with one or more of receivers 38, DCU 42, or host 46. Those skilled in the art will appreciate that the various tasks performed by any one of the different forms of computer contemplated for use in connection with the present invention may, to a large extent, alternatively be distributed across multiple computers since the various forms of computers are or can be in data communication with one another. Accordingly, for the purposes of the present invention, tasks performed at any of the different forms of computer discussed herein may generally be performed at other ones of the computers, alone or in combination with the other forms of computers.

FIG. 2 shows a side view of one embodiment of one form of an asset tag 48 that may be used in connection with the present invention. The form of asset tag 48 depicted in FIG. 2 is integrated with a bulk product dispensation controller 50 configured as a pour spout. Dispensation controller 50 is of a type used by bars and others to control the flow of beverage poured from the bottles so that the dispensation quantity and flow may be more easily judged and managed by bartenders. Dispensation controller 50 is typically inserted in the neck of a bottle in lieu of the bottle's original lid or stopper. But in other applications, dispensation controller 50 may be in the form of a tap, cork, stopper, door, port, portal, switch, valve, and the like. And, nothing requires asset tag 48 to be associated with a dispensation controller 50. In one embodiment, asset tag 48 is attached to the bottom of a container 26, desirably partially or totally within the standard indentation found on most commercially available liquor bottles.

Asset tag 48 includes a mount detector 52 that detects whether asset tag 48 and its integrated dispensation controller 50 are mounted on a container 26 (FIG. 1). In the preferred embodiment, mount detector 52 is configured as a switch that is depressed when dispensation controller 50 is mounted on (e.g., inserted into the neck of) a container 26. But this configuration is not a requirement. In addition, asset tag 48 desirably includes one or more user input devices 54 in the form of push-button switches through which user input may be collected by asset tag 48. User input represents data provided by a user, such as a bartender, of asset tag 48.

FIG. 3 shows a sequence depicting a dispensation of a bulk product 56 in the form of a beverage from a container 26 in the form of a bottle. In accordance with this embodiment of the present invention, product 56 is dispensed by a user, such as a bartender or other server, when the user pours product 56 from container 26 by tilting the container 26. FIG. 3 depicts three different orientations for a container 26 that is equipped with an asset tag 48. In an inactive orientation 58, no product 56 is being dispensed from container 26. Container 26 is upright. The force of gravity keeps product 56 in the lower portion of container 26, up to a product level 60, while asset tag 48 and its integrated dispensation controller 50 are located in the upper portion of container 26. Inactive orientation 58 is the usual orientation for storage of container 26 when product 56 is not being dispensed.

When it is desired to dispense product 56 from container 26, container 26 is tilted away from its inactive orientation 58. Desirably, container 26 is quickly tilted to a pour orientation 62, which is greater than an angle 63 of approximately 135°±15° displaced from inactive orientation 58. So long as the tilt angle remains greater than approximately 135°±15°, dispensation controller 50 will dispense product 56 at a roughly consistent dispensation rate regardless of the precise tilt angle. Asset tag 48 is configured to detect the duration container 26 spends at a tilt angle greater than angle 63 so that the amount of product 56 dispensed can be calculated by multiplying this duration by a dispensation rate.

But in order for pour orientation 62 to be reached from inactive orientation 58, container 26 is first tilted to and through an intermediate orientation 64. In the preferred embodiment, pour orientation 62 begins 20°-60° past intermediate orientation 64. Likewise, around the completion of the dispensation of product 56, container 26 is again tilted to and through intermediate orientation 64 as container 26 is repositioned in inactive orientation 58.

Intermediate orientation 64 is at a relatively lower tilt angle 65 of displacement away from inactive orientation 58 than pour orientation 62. In the preferred orientation, intermediate orientation angle 65 begins at around 90° displacement from inactive orientation 58 and continues until pour orientation 62 is reached at angle 63. Some product 56 may be dispensed while container 26 is tilted to or near intermediate orientation 64, depending on the amount of product 56 in container 26, its viscosity, and other factors. But the dispensation rate is likely to be erratic and lower than the dispensation rate when container 26 is in pour orientation 62. In order to permit the bartender as much freedom as possible within which to exhibit bartender flair, nothing in the present invention prevents the bartender from making the pour with an extended duration in intermediate orientation 64, although this is not encouraged. In order to accurately describe the amount of product 56 dispensed from container 26 and to gain knowledge of a situation when inaccurate data may be generated due to an excessive duration in intermediate orientation 64, asset tag 48 detects the duration spent in intermediate orientation 64 and the duration spent in pour orientation 62.

In the preferred embodiment, asset tag 48 is configured so that angles 63 and 65 are substantially solid angles. In a typical and proper dispensation, container 26 is tilted in a forward direction (i.e., the direction dispensation controller 50 points). But angles 63 and 65 will be detected regardless of whether container 26 is tilted forward, backward, or toward the side.

While FIG. 3 depicts a dispensation from a bottle type of container, those skilled in the art will appreciate that dispensations may also occur from other types of containers, including containers, such as beer kegs, with tap handles 28 (FIG. 1), to which asset tags 48 may be coupled.

FIG. 4 shows a block diagram of one embodiment of an asset tag 48 that may be used in connection with the present invention. As discussed above, asset tag 48 represents one form of computer. A controller 72 is provided by a microprocessor, microcontroller, or other programmable device. Controller 72 couples to a 90° solid angle tilt detector 74, a 135° solid angle tilt detector 76, a clock 78, mount detector 52, user interface or input device 54, a user feedback device 80, a transmitter 82, and a memory 84. A battery 86 provides electrical power for asset tag 48 and may directly or indirectly provide power to any and/or all of the components of asset tag 48. Ninety-degree tilt detector 74 indicates when asset tag 48 has been rotated around 90° or more from its substantially horizontal orientation achieved when container 26 is in its inactive orientation 58 (FIG. 3). One-hundred-thirty-five-degree tilt detector 76 indicates when asset tag 48 has been rotated around 20°-60° beyond the angle detected by tilt detector 74, and preferably 135°±15° or more from its substantially horizontal orientation. Clock 78 provides a time base for asset tag 48 so that asset tag 48 may time the durations its container 26 spends in the pour and intermediate orientations 62 and 64 (FIG. 3). Mount detector 52 is desirably configured as a switch that is depressed when asset tag 48 and its integrated dispensation controller 50 are mounted on a container 26. User input device 54 may be provided by one or more switches that are located so that they can be manipulated by a user.

User feedback device 80 may be provided by one or more of lights, displays, buzzers, vibrators, and the like. User feedback device 80 provides information to the user about the operation of asset tag 48. In one embodiment, user feedback device 80 is a light that flashes at a constant rate as product 56 (FIG. 3) is dispensed. The light flashes in a different manner as a warning when asset tag 48 detects an extensive duration in intermediate orientation 64, when asset tag 48 detects an overpour event, and/or if mount detector 52 is not depressed for a predetermined time period. An extensive duration in intermediate orientation 64 can occur, for example, when asset tag 48 is tilted to at least intermediate orientation 64 but not beyond pour orientation 62.

In the embodiment depicted in FIG. 4, asset tag 48 transmits data to receivers 38 (FIG. 1) using a wireless, RF communication scheme. No receiver is included in asset tag 48, so the communication scheme is unidirectional. This communication scheme provides advantages in accommodating a wide degree of freedom in the operation of premises 20 (FIG. 1) and in keeping the operation of asset tag 48 at a very low power level so that a small battery 86 may be used and not often replaced, if at all. Transmitter 82 couples to an antenna 87 and provides upconversion and amplification functions for the data communicated by asset tag 48. But those skilled in the art will appreciate that asset tag 48 may alternately provide and transmit using other types of electronic communication schemes, including bidirectional schemes, optical schemes, infrared schemes, inductive schemes, capacitive schemes, magnetic schemes, acoustic schemes, and schemes based on direct physical connection between contacts in asset tag 48 and a device in data communication with asset tag 48.

Memory 84 provides a variety of functions for asset tag 48. A program section 89 of memory 84 provides computer programming instructions to be executed by controller 72 in a manner well known to those skilled in the art. A static data section 88 provides nonvolatile data that are used by the computer programming and that tend to remain unchanged for a long period of time, and perhaps for the life of asset tag 48. Examples of static data 88 include an identification code (tag ID) 90 that uniquely identifies asset tag 48 at least within the confines of premises 20 and a schedule 92 that defines when asset tag 48 is to transmit data.

In accordance with one embodiment of the present invention, host 46 also knows schedule 92, or at least a portion of it, and detects whether host 46 has received communications in accordance with schedule 92. If a communication is not received in accordance with schedule 92, then host 46 provides a warning that data may have been lost so that an appropriate audit may be conducted.

A dynamic data section 94 provides storage for data that change as a result of the normal operation of asset tag 48. One example of dynamic data section 94 is a buffer that includes a plurality of event records 96. Each event record 96 includes data describing a past event that has been detected and recorded by asset tag 48. Examples of events that may be detected and recorded by asset tag 48 include product 56 dispensation events, and switch events. Switch events describe a change in state of switches that serve as mount detector 52 and user input devices 54 in the preferred embodiment. It is event records 96 that are transmitted to host 46, possibly through receivers 38 and DCU 42 (FIG. 1) as discussed above, in accordance with schedule 92. Dynamic data section 94, or a portion thereof, may be implemented using nonvolatile memory.

Of course, those skilled in the art will appreciate that FIG. 4 depicts one of many different computer configurations that may be used by asset tag 48, and that asset tag 48 is not limited to precisely this configuration. In one preferred embodiment, clock 78, memory 84, and controller 72 are integrated together on a common semiconductor substrate. In another embodiment, transmitter 82 is also integrated with controller 72.

Figure 5:
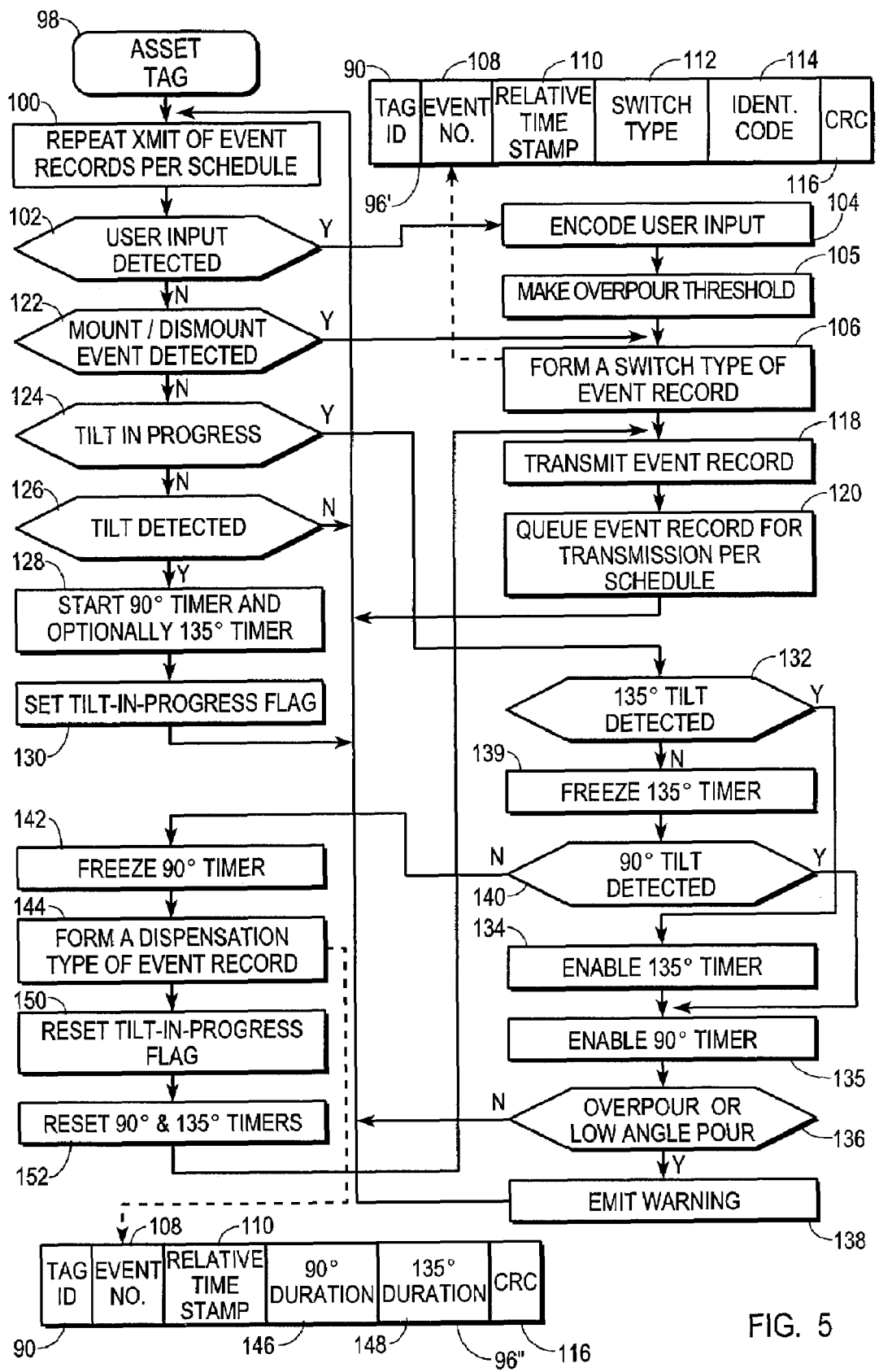
FIG. 5 shows a flow chart of a process performed by the asset tag of FIG. 4.

FIG. 5 shows a flow chart of a process 98 performed by asset tag 48. Process 98 may be defined primarily by computer programming stored in program section 89 of memory 84. FIG. 5 depicts process 98 as operating in a continuous programming loop which may be viewed as starting at a task 100.

Task 100 repeats the transmission of event records 96 (FIG. 4) as defined by schedule 92 (FIG. 4). In one embodiment, schedule 92 causes transmissions of each event record 96 immediately upon the event's occurrence and at around one-second intervals thereafter for 3-5 seconds. Then, the repetitions are restricted to a rate of once every 10-16 seconds until the event is around one minute in the past. At that point, repetitions are scheduled to occur every 15-30 minutes indefinitely, or until the event record 96 is overwritten by a subsequent event record 96. Transmission intervals may be adjusted based on rules and regulations set forth by the Federal Communications Commission or other authorities.

In another embodiment, schedule 92 causes asset tags 48 to transmit a periodic beacon transmission. Beacon transmissions occur every 1-5 minutes in the preferred embodiment. To conserve bandwidth and battery power, asset tag beacon transmissions include only asset tag ID 90 and the most recent event number 108, but need not include event records 96. Beacon transmissions are used to assist in determining the last time a transmission was received from an asset tag 48, which indicates the last known time that the asset tag 48 was within the radio reception range of a receiver 38. The most recent event number 108 is used by the system to determine whether host 46 has collected all event records 96 from an asset tag 48. Of course, beacon transmissions may include other information about, or stored in, an asset tag 48.

The repeating of transmissions of event records 96 improves the reliability and completeness of inventory-usage data captured by the system. If any event record 96 is missed for any reason, then that event record 96 will be transmitted again at some point in the future until the event record 96 is overwritten. Task 100 examines the buffer of event records 96 in dynamic memory 94 (FIG. 4) and causes all event records 96 that are scheduled for transmission to be transmitted, then queues such event records 96 for a repeat transmission at a future time determined in accordance with schedule 92.

Following task 100, a query task 102 evaluates whether any user input is being detected at the user interface provided by user input device 54. If such user input is being detected, a task 104 suitably collects and encodes the user input for communication to host 46, and a task 106 forms a switch type of event record 96'.

In one embodiment of the present invention, user input detected at asset tags 48 indicates the user's intention for an upcoming dispensation of product 56 (FIG. 3). This user input can be used to establish the amount of product 56 that the user intends to dispense and/or an intended sales price or expected revenue for the product 56 that is to dispensed. In particular, the dispensation of product 56 may be rung-up using asset tags 48. This allows an association of sales prices or revenue with individual drinks categorized to the specific bottle from which the drinks were poured and time of day, all without a bartender having to negotiate the complicated entry mechanism of a POS terminal and without requiring the bartender to physically move to register 30 (FIG. 1). The bartender desirably enters only an indication of which price point is appropriate for the drink he or she is pouring or getting ready to pour. The price point either implicitly or explicitly also corresponds to the amount of product 56 that the bartender pours. The specific asset tag 48 used to ring-up the drink provides brand identity information through an association with a specific container 26. Thus, a centralized ring-up function previously performed at POS terminals is simplified and distributed through asset tags 48 installed on different containers 26 from which products 56 are dispensed.

In one embodiment, different price points are associated with well, call, and premium drinks and with different sizes of drinks. And, a different price structure may be applied when mixed drinks are being poured. Thus, different numbers of presses on a left user input device 54, for example, signify different price points for single-component drinks, and different numbers of presses on a right user input device 54, for example, signify different price points for multiple-component drinks. When a plurality of drinks are being poured in a cascaded manner, the opposite button can be pressed a number of times that reflects the number of individual drinks of the same type being poured.

Task 104 may detect and encode a button sequence so that a desired price point can be communicated to host 46. And, nothing requires button presses to be used only for ringing up sales. Button-press sequences may be defined for encoding a variety of items. For example, a sequence may be defined that erases a previously-entered sequence. A sequence may be defined that informs the system that a previously-entered sequence was incorrect. A sequence may be defined that instructs asset tag 48 to enter a programmable state where asset tag 48 may then be personalized. And, the buttons may also be used to communicate user-information through timing rather than mere sequencing, as discussed herein. For example, information may be encoded through a sequence of long and short button presses. These and other modifications are intended to be included within the scope of the present invention.

Following task 104, a task 105 may, in one embodiment of the present invention, make or translate the user input sequence encoded in task 104 into an overpour threshold. Task 105 is desirably included in an embodiment of asset tag 48 that has been programmed to know dispensation rates at which product 56 is dispensed from container 26. Task 105 translates the user input into an intended quantity of product 56 to be dispensed. Then, based on the dispensation rates and the durations spent in intermediate and/or pour orientations 62 and 64 (FIG. 3), asset tag 48 can calculate in real time the quantity of product 56 being dispensed. When the overpour threshold determined in task 105 is reached, asset tag 48 may emit a suitable warning.

FIG. 5 illustrates an exemplary format of a switch type of event record 96', as may be formed during a task 106, which follows task 105, and stored in dynamic memory 94 (FIG. 4). Until the buffer for event records 96 within dynamic memory 94 is full, an unused buffer location is selected for storing the event record 96. After the buffer is full, the oldest event record 96 is desirably overwritten.

Event record 96' may convey tag ID 90. And, event record 96' may convey an event number 108. Event number 108 represents a count value in the preferred embodiment. As each event is detected at a given asset tag 48, an event counter is incremented. And, the event counter is desirably stored in nonvolatile memory. Task 106 may increment this event counter and include the result in the event record 96' being formed. This count will be communicated to host 46 as event number 108. Of course, those skilled in the art will appreciate that other algorithms beside incrementing may also be implemented to generate unique event numbers 108. As discussed below, host 46 uses event number 108 to detect whether any data has been missed. In particular, if an event record 96 is received having an event number 108 so far different from the previously received event number 108 from the same asset tag 48 as to indicate that an event record 96 has been missed by host 46, then a warning is provided to a user so that an appropriate audit may be conducted.

Event record 96' may also include a relative time stamp 110. Relative time stamp 110 reflects another count value that is maintained to record the passage of time relative to the time base of the asset tag 48. Desirably, when the event record 96' is actually transmitted, for example during task 100, this relative time value is converted into a value that is relative to the moment of transmission so that the receiving computer device may then synchronize the event record 96' to the receiving device's time base. In other words, the relative time stamp 110 may be converted at the moment of transmission to indicate how far in the past the respective event occurred, and the receiving device may make a corresponding translation to its own time base. That way, computer devices in data communication with one another need not maintain synchronized time bases, but the times when various events occurred will be known to host 46 when the events are eventually processed.

Event record 96' may also include a switch type code 112, which may, for example, identifies whether a user input event is being described or whether a mount or dismount event is being described. And, an identifying code 114 may be included, which can specifically describe the precise meaning of the event. For example, code 114 may specify whether a mount or dismount event has been detected. Or code 114 may be encoded to specify a specific button-press sequence. Event record 96' may also include a data-check field, such as a cyclic redundancy check (CRC) 116, so that a receiving device may verify the accuracy of any data received. If inaccurate data are detected, such data may be discarded because a subsequent repetition of the data will be attempted in accordance with schedule 92, as discussed above.

Following task 106, a task 118 causes the just-formed event record 96 to be transmitted in accordance with the embodiment of asset tag 48 depicted in FIG. 4. Accordingly, the first transmission of an event record occurs immediately upon detection of the event, giving the system nearly real-time data concerning detected events. Next, a task 120 queues the just-transmitted event record 96 for repetitive transmissions in accordance with schedule 92. Following task 120, program flow loops back to task 100.

The transmission of event record 96 which takes place during task 118 and its subsequent repetitions can be detected by multiple ones of receivers 38 (FIG. 1) to improve the likelihood of the event record being accurately received. And, the repeated transmissions improve that likelihood still further so that the resulting probability of an event not eventually being accurately reported is very low, absent tampering, device failure, accidents, or removal of containers from premises 20. But, when data is not reported, this condition is likely to be detected and warnings issued so that the appropriate audit may take place. Accordingly, a reasonably good quality of data results, and situations that might lead to corrupted or incomplete data are detected soon after the situations occur so that meaningful audits may take place. By permitting unusual situations to go unreported, but still detecting the unreported situations, a reasonably priced system is provided that forms a knowledge base from which good management decisions can be made.

When task 102 fails to detect a user input, a query task 122 determines whether a mount or dismount event has been detected. When a mount or dismount event is detected, program flow proceeds to above-discussed task 106 to form, transmit, and queue repetitions for a switch-type event record 96' describing the mount or dismount event.

When task 122 fails to detect a mount or dismount event, a query task 124 determines whether a tilt event is in progress. Task 124 may make its determination by evaluating a tilt-in-progress programming flag that is set when a tilt event is first detected and cleared when the tilt event finishes.

When a tilt is not in progress, a query task 126 then determines if a tilt is being first detected at the instant task 126 is being performed. Task 126 may be performed by evaluating 90° and 135° tilt detectors 74 and 76 (FIG. 4). If neither of tilt detectors 74 and 76 is active, then no tilt event is being detected, and program flow loops back to task 100. Of course, in this context the term active indicates that a tilt detector is sensing a tilt angle greater than or equal to the angle it is configured to sense. Nothing requires tilt detectors to be configured in any particular way or to exhibit any particular polarity.

But when one of tilt detectors 74 and 76 is detected as being active, a tilt event is declared by starting a timer in a task 128 and setting the tilt-in-progress flag in an optional task 130. In the preferred embodiment, the tilt-in-progress flag is actually set and cleared in a separate process that is invoked in response to interrupts generated when the respective tilt detectors initially indicate a state of greater or less tilt angle than they are configured to sense. But this is not a requirement, and alternate embodiments may include task 130 for this purpose.

In the typical scenario, 90° tilt detector 74 is first discovered to be active while 135° tilt detectors 76 is still inactive. This corresponds to intermediate orientation 64 (FIG. 3). In this situation, only a 90° timer is started to count the duration for which container 26 remains at an orientation greater than approximately 90° away from inactive orientation 58 (FIG. 3). But, it may be possible that container 26 is tilted so quickly that this typical scenario is not discovered and task 126 instead discovers that both of tilt detectors 74 and 76 are active. This situation corresponds to pour orientation 62 (FIG. 3), and the 90° timer is started along with a separate 135° timer. Following task 130, program flow loops back to task 100.

When task 124 discovers that a tilt event is in progress, program flow collects the dispensation data that will describe the quantity of bulk product 56 being dispensed from container 26. A task 132 detects whether a 135°±15° or greater tilt (i.e., pour orientation 62) is being detected by evaluating 135° tilt detector 76. If pour orientation 62 is detected, then a task 134 is performed to enable both the 135° timer discussed above in connection with task 128. Task 134 may be implemented simply by doing nothing and letting a previously enabled counter continue to count the passage of time. After task 134, a task 135 likewise enables the 90° timer, which may also be implemented simply by doing nothing and letting a previously enabled counter continue to count the passage of time. But in the typical scenario, pour orientation 62 will be first discovered at task 132 and the 135° timer will be first enabled through the performance of task 134.

Following task 135, a query task 136 determines whether a pour error has been detected. In particular, task 136 detects for an overpour condition in an embodiment where task 105, discussed above, was able to translate user input into an overpour threshold. Thus, task 136 evaluates the time spent in pour and intermediate orientations 62 and 64 and multiplies this time by the appropriate expected dispensation rates to obtain an estimate of the quantity of product 56 dispensed. If this quantity is greater than or equal to the overpour threshold, a pour error has been detected. In addition, task 136 may evaluate the time spent in intermediate orientation 64 and compare this duration against a predetermined threshold. If task 136 finds that too much time has been spent in intermediate orientation 64, another type of pour error has been detected. This situation represents a pour error because the data being collected about the dispensation is at risk of becoming inaccurate.

When task 136 detects a pour error, a task 138 causes asset tag 48 to emit a suitable warning through user feedback section 80 (FIG. 4). Such a warning may be a flashing red light, buzzer, or the like. After task 138 and when task 136 fails to detect a pour error, program flow loops back to task 100.

When task 132 fails to detect a 135° or greater tilt, a task 139 is performed to freeze the 135° timer. By freezing the 135° timer, the count value achieved therein is latched but not cleared, reset or otherwise altered. In the typical scenario, task 136 will freeze the 135° timer as container is up-righted to its intermediate orientation 64 from its pour orientation 62 (FIG. 3).

Next, a query task 140 determines whether a 90° or greater tilt (i.e., intermediate orientation 62) is being detected. If the intermediate orientation 62 is still being detected, task 135 is performed to enable the 90° timer, and program flow continues to task 136 to evaluate the pour for a pour error. In the most likely scenarios, task 135 will simply do nothing because the 90° timer will already be enabled by task 128.

But when task 140 fails to detect intermediate orientation 64, a task 142 freezes the 90° timer, and a task 144 forms a dispensation type of event record 96". FIG. 5 illustrates an exemplary format of a dispensation type of event record 96", as may be formed during task 144 and stored in dynamic memory 94 (FIG. 4). Until the buffer for event records 96 within dynamic memory 94 (FIG. 4) is full, an unused buffer location is selected for storing the event record 96. After the buffer is full, the oldest event record 96 is desirably overwritten.

Event record 96" includes a tag ID 90, event number 108, relative time stamp 110, and data check 116 as discussed above in connection with switch type event record 96'. But dispensation event record 96" desirably includes a 90° duration value 146 and a 135° duration value 148, or the equivalent. Of course data may be encoded as convenient to reduce storage space and the amount data that needs to be transmitted. In one embodiment, the 90° duration value 146 is converted into a value that directly describes the duration spent in intermediate orientation 64 by subtracting 135° duration value 148 from the duration recorded by the 90° timer. These and other mathematical equivalents that convey similar information although transformed through basic mathematical operations are included within the scope and meaning of duration values 146 and 148.

Together, values 146 and 148 accurately describe a dispensation of product 56. Host 46 will use values 146 and 148 to calculate an accurate indication of the amount of product 56 that was actually dispensed from container 26. Desirably, one dispensation rate will be applied for the duration that container 26 was in its intermediate orientation 64 (i.e., between 90° and 135°) and another dispensation rate will be applied for the duration that container 26 was in its pour orientation 62 (i.e., greater than 135°). The use of different dispensation rates applied to the durations container 26 spends in different orientations provides an indication of when the data being collected is at risk of becoming inaccurate and also promotes the collection of accurate data concerning inventory usage.

Following task 144, a task 150 resets tilt-in-progress flag, indicating that the tilt event is now over. Then a task 152 resets the 90° and 135° timers so that they will begin counting from a duration of zero the next time they are enabled. After task 152, program flow proceeds to above-discussed task 118 to transmit the just-formed dispensation event record 96", queue the event record 96" for repeated transmissions, and loop back to task 100.

While the flow chart of FIG. 5 depicts one embodiment of process 98, those skilled in the art will appreciate that process 98 can be configured in a wide range of variations while still accomplishing substantially the same functions. In particular, the grouping and ordering of tasks may be altered considerably, as well as the nature, grouping, and placement of variables and records. In addition, a number of additional tasks may be included. For example, while FIG. 5 depicts program flow as proceeding directly to task 100 from any number of other tasks within process 98, it may be desirable to allow controller 72 and the other components of asset tag 48 to first enter a sleep or stand-by mode for a time prior to returning to task 100 to reduce power consumption. In another example, asset tag 48 may be programmed to expire or stop transmitting after a certain amount of time has transpired and/or a certain number of events 108, and data related to expiration parameters may be stored in nonvolatile memory for reliability. These and other variations are intended to be included within the scope of process 98.

Figure 6:
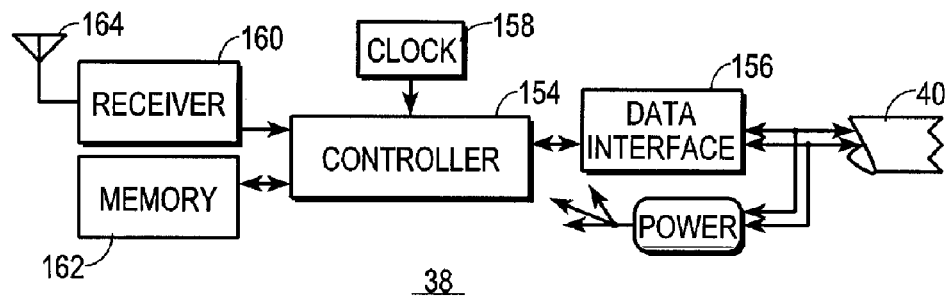
FIG. 6 shows a block diagram of one embodiment of a receiver that may be used in connection with the present invention.

FIG. 6 shows a block diagram of one embodiment of a receiver 38 that may be used in connection with the present invention. As discussed above, receiver 38 represents one form of computer. A controller 154 is provided by a microprocessor, microcontroller, or other programmable device. Controller 154 couples to a data interface 156, a clock 158, a receiver 160, and a memory 162. Data interface 156 couples data to and from receiver 38 and communication link 40, which is serviced by DCU 42 (FIG. 1). In addition, electrical power for receiver 38 is obtained from link 40 and provided to any and/or all components of receiver 38. Through data interface 156, DCU 42 and/or host 46 are in data communication with receiver 38. Clock 158 provides a time base for receiver 38. Receiver 160 couples to an antenna 164 and is compatible with transmitter 82 of asset tag 48 (see FIG. 4). Memory 162 provides computer programming along with static and dynamic storage for receiver 38. Of course, other components, such as input and/or output devices, may also be included, and alternate architectures may be used as well.

In the preferred embodiment, receiver 38 performs little data processing, but nothing prevents other data processing functions from being distributed into receiver 38. In the preferred embodiment, when receiver 38 receives event records 96 (FIG. 4) from asset tags 48, the event records 96 may be checked for redundancy, and effectively discarded if found to be redundant. Receiver 38 may also retain the event number of the most recent beacon transmission received from each asset tag 48 and the time stamp of the most recent transmission (whether event transmission or beacon transmission) received from each asset tag 48. Redundant records may result from the repeated transmissions of event records 96 discussed above in connection with FIG. 5. Redundancy may be checked by evaluating tag ID 90 and event number 108 (FIG. 5) in a just-received event record 96 against tag ID's 90 and event numbers 108 of stored event records 96. If a just-received event record 96 is not redundant, then it is stored in memory 162.

A data communication protocol is established between receiver 38 and DCU 42 wherein event records 96 stored in receiver 38 are uploaded to DCU 42 upon request by DCU 42. The protocol calls for receiver 38 to discard event records 96 that have been successfully uploaded to DCU 42. DCU 42 may also upload from receiver 38 the event number from the most recent beacon transmission received from each asset tag 48 and the time stamp of the most recent transmission (whether event transmission or beacon transmission) received from each asset tag 48.

Figure 7:
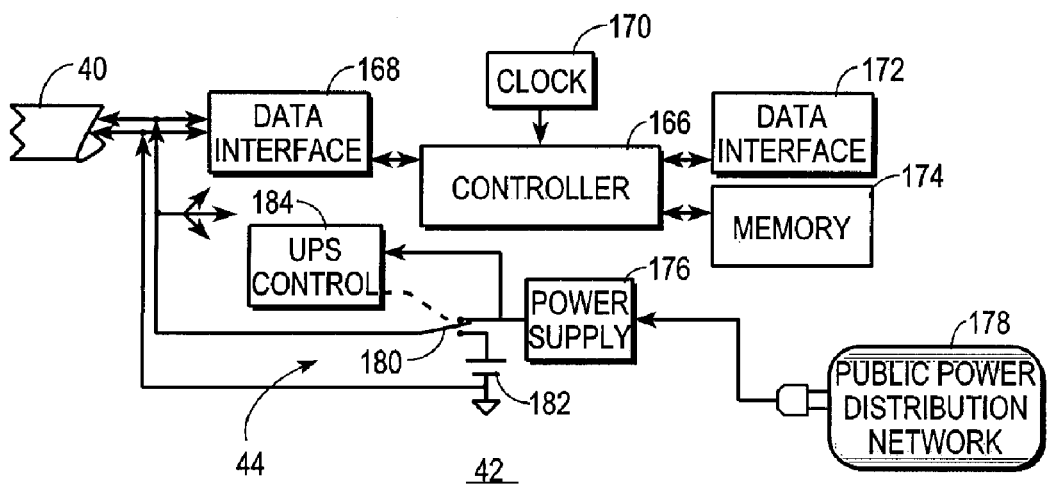
FIG. 7 shows a block diagram of one embodiment of a data collection unit that may be in data communication with the receiver of FIG. 6 in one embodiment of the present invention.

FIG. 7 shows a block diagram of one embodiment of a DCU 42 that may be in data communication with one or more receivers 38 and with host 46 in one embodiment of the present invention. As discussed above, DCU 42 represents another form of computer. A controller 166 is provided by a microprocessor, microcontroller, or other programmable device. Controller 166 couples to a data interface 168, a clock 170, a data interface 172, and a memory 174. Data interface 168 couples data to and from DCU 42 and communication link 40, which also serves receivers 38 (FIG. 1). Clock 170 is provided to maintain a time base for DCU 42, and memory 174 provides computer programming along with static and dynamic storage for DCU 42. Data interface 172 is provided to support a data communication link between DCU 42 and host 46. As discussed above, host 46 may use this data communication link only occasionally to upload event records on an as-needed basis. But nothing prevents host 46 from being continuously connected to DCU 42 if desired. Of course, other components, such as input and/or output devices, may also be included, and alternate architectures may be used as well.

Uninterruptible power source 44 operates in conjunction with DCU 42 and includes a power supply 176 which receives electrical power from a public power distribution network 178 and converts such electrical power into a form suitable for powering DCU 42 and any receivers 38 on communication link 40. The form of electrical power suitable for powering DCU 42 and receivers 38 couples through a switch 180 and is applied to any and/or all components of DCU 42 as well as to communication link 40. In addition a battery 182 provides electrical power suitable for powering DCU 42 and receivers 38. A UPS control element 184 monitors the power converted from public power distribution network 178. When power converted from public power distribution network 178 is adequate, switch 180 routes such power to DCU 42 and to receivers 38, while charging battery 182. But when such power becomes inadequate, control element 184 causes switch 180 to route power from battery 182 to DCU 42 and receivers 38.

Like receivers 38, DCU 42 performs little data processing in the preferred embodiment. In the preferred embodiment, DCU 42 requests uploads of event records 96 from receivers 38 from time to time. But receivers 38 may also just send data to DCU 42 from time-to-time without DCU 42 making a request for the data. When DCU 42 receives such event records 96 (FIG. 4) from asset tags 48 via receivers 38, the event records 96 may be checked for redundancy, and discarded if found to be redundant. DCU 42 may also retain the event number of the most recent beacon transmission received from each asset tag 48 and the time stamp of the most recent transmission (whether event transmission or beacon transmission) received from each asset tag 48. Redundant records may result from the repeated transmissions of event records 96 discussed above in connection with FIG. 5. But redundant event records may also result from the same repetitions of transmitted event records 96 being received at different receivers 38. If a just-received event record 96 is not redundant, then it is stored in memory 174. Desirably, the memory capacity and battery capacity of DCU 42 are such that DCU 42 and receivers 38 may remain operational without the loss of data for several weeks without relying on public power distribution network 178 for electrical power and without needing host 46 to upload data from DCU 42.

Figure 8:
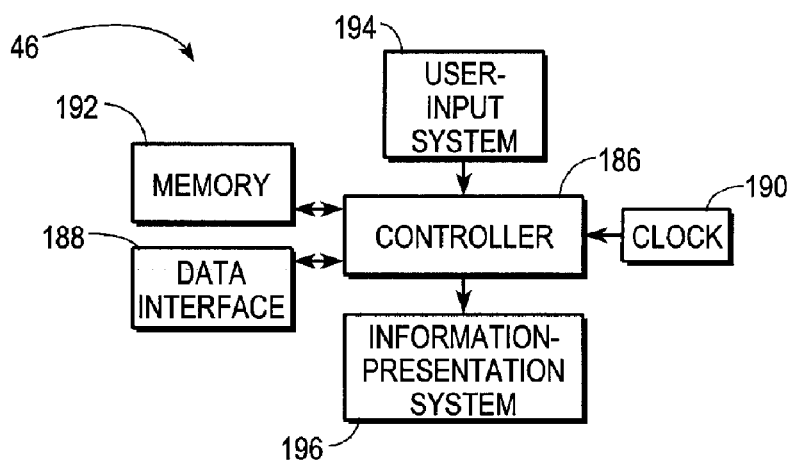
FIG. 8 shows a block diagram of one embodiment of a host that may be in data communication with the asset tag of FIG. 4, the receiver of FIG. 6, and/or the data collection unit of FIG. 7.

FIG. 8 shows a block diagram of one embodiment of host 46 that may be in data communication with the asset tag 48 of FIG. 4, the receiver 38 of FIG. 6, and/or the data collection unit 42 of FIG. 7. As discussed above, host 46 represents another form of computer. A controller 186 is provided by a microprocessor, microcontroller, or other programmable device. Controller 186 couples to a data interface 188, a clock 190, a memory 192, and a user input system 194. Data interface 188 couples data to and from DCU 42. Clock 190 is provided to maintain a time base for host 46, and memory 192 provides computer programming along with static and dynamic storage for host 46. User input system 194 may be provided by any of a variety of user input devices which conventionally couple to computers, including keypads, keyboards, mouse, microphone, network link, and the like. In one embodiment, host 46 is provided by a conventional handheld, laptop, personal computer, or workstation.

Host 46 and controller 186 also couple to or are otherwise in data communication with an information presentation system 196. Information presentation system 196 includes any of a set of devices which can be used to present information to a user of host 46. Such devices may include, but are not limited to, a display, printer, network connection, lights, speaker, buzzer, and the like.

As discussed in more detail below, host 46 and information presentation system 196 are cooperatively configured to present various items of information to a user. Such items may be viewed as being in the nature of performance feedback, a warning, or a report. Generally, performance feedback lets a bartender and his/her management know how accurately the bartender is pouring drinks. A warning results when situations are automatically detected in response to inconsistencies in incoming data from asset tags 48 suggesting that some problem has or might have occurred within the operation of premises 20. The suggested problem might possibly require management attention, which is referred to as an audit herein. Example warnings include information which informs a user of a failure of a container 26 to reconcile, missing event records 96, and a failure of an asset tag 48 to transmit in accordance with its schedule 92. Reports are typically generated at the request of a user who is seeking information so that a particular type of audit may be performed. Example reports include information which informs a user of the amount of product 56 remaining in a container 26 at a given point in time and of expected revenue totaled over some period so that an audit of expected revenue against actual collected revenue may be performed. Reports about asset tags 48 may include information about the last time each asset tag 48 transmitted, indicating to the user the currentness of information about each container 26 as of a specific date and time range. Reports may also indicate the last known time an asset tag 48 was within radio range of a receiver 38. Reports may also generate a warning if the system determines that event records 96 from an asset tag 48 have not been collected by host 46.

Figure 9:
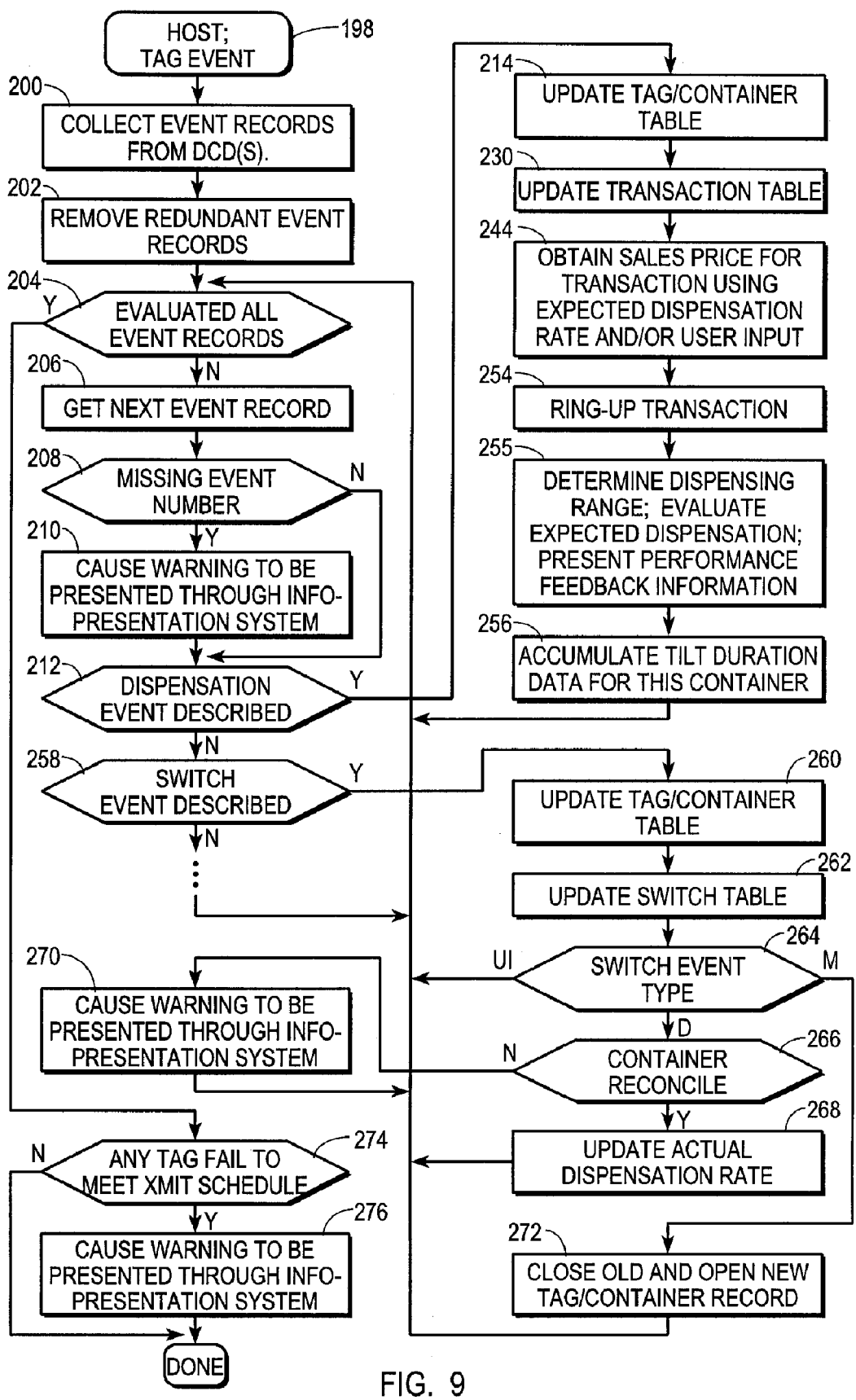
FIG. 9 shows a flow chart of an exemplary tag event process performed by the host of FIG. 8 in one embodiment of the present invention.

FIG. 9 shows a flow chart of an exemplary tag event process 198 performed by host 46 in one embodiment of the present invention. But, as discussed above, host 46 is only one of many different computer devices discussed herein, and some or all of the tasks of process 198 may alternatively be distributed to other computer devices. In one embodiment, host 46 may be incorporated with or otherwise couple to a register 30 (FIG. 1).

Process 198 includes a task 200 in which event records 96 (FIGS. 4-5) are collected from one or more DCU's 42. But in other embodiments, event records 96 may alternatively be collected directly from asset tags 48 and/or from receivers 38. After task 200, a task 202 removes any redundant event records 96 which may have been collected or be redundant with event records 96 previously collected. The time stamp of the most recent transmission (whether event transmission or beacon transmission) received from each asset tag 48 is retained. Redundant event records 96 may result because asset tags 48 repetitively transmit the same event records 96 over and over at different times in accordance with schedule 92, the same event records 96 transmitted at a given instant may be received at more than one receiver 38, and multiple DCU's 42 may form somewhat redundant collections of Next, a query task 204 determines whether all event records 96 just collected have been evaluated in a programming loop. So long as at least one event record 96 remains to be evaluated, a task 206 is performed after task 204. Task 206 identifies the next event record 96 to process from the collection. Then, a query task 208 determines whether the subject event record 96 evidences a missing event number.

In particular, task 208 may evaluate whether the event number 108 (FIG. 5) for the immediately previous event record 96 received from the same asset tag 48 precedes the event number 108 of the current event record 96 by a value of more than one, assuming that event numbers 108 increment by one for each event. And, task 208 may also evaluate whether the event number 108 from a beacon transmission is greater than the event number 108 of the last received event record 96. In general, when a missing event number is detected in task 208, process 198 has determined that a reportable event occurred at the container 26 associated with the subject asset tag 48, that the reportable event was detected by the subject asset tag 48, but that the reportable event has not yet been described in the data received at process 198. In this situation, a task 210 is performed in the preferred embodiment.

Task 210 causes a suitable warning to be presented through information-presentation system 196 (FIG. 8). The warning indicates that an event and the data describing the event were missed by process 198. Following task 210, and when task 208 determines that no event number 108 is missing, a query task 212 is performed.

Task 212 determines whether the subject event record 96 being evaluated by process 198 describes a dispensation event. When a dispensation event record 96" (FIG. 5) is detected, a task 214 updates a data structure used to track data relevant to asset tags 48 that have been assigned to a container 26. Such a data structure is exemplified by a tag/container table 216 depicted in FIG. 10.

Referring to FIG. 10, tag/container table 216 depicts exemplary relationships between various data items used in process 198. In particular, the tag ID 90 of an asset tag 48 is associated with the product ID 218 for a product that is held by a particular container 26 to which the asset tag 48 has been assigned and on which the asset tag is mounted. This association also reflects a time stamp 220 for the last transmission received from the asset tag 48. Time stamp 220 is one of the data items that is updated in task 214. The event number 108 for the last-received event record 96 from the asset tag 48 is also included in the association, but updated in task 214 to reflect the current event number. In addition, the association includes a value for the initial amount 222 of product 56 held in container 26 (e.g., the amount of beverage in a full bottle if asset tag 48 was installed on a full bottle or a partially full bottle if asset tag 48 was installed on a partially full bottle). A cost 223 corresponds to the cost to the premises 20 of the initial amount 222 (e.g., the cost of goods for a full bottle). And, the association includes accumulated intermediate and pour durations 221' and 221" which describe the total time spent in intermediate orientation 64 and in pour orientation 62 since the container 26 was "opened" with initial amount 222 of product 56. This association includes values for actual dispensation rates 224' and 224", expected dispensation rates 226' and 226", an identifier of a image 227 that, when displayed, shows a likeness of the container 26, and various other container 26 or asset tag 48 parameters 228 or links thereto. Such other items may include the location of a container 26.

Asset tag ID 90 may be associated with a particular container 26 using several techniques. In the preferred embodiment, a user selects an asset tag programming mode on host 46 and inputs information to be associated with the asset tag 48. The user may then tilt asset tag 48 in a predetermined sequence, may press user input device 54, or otherwise cause asset tag 48 to transmit a signal that includes asset tag ID 90. The asset tag ID 90 that is transmitted is associated by host 46 with the information input by the user. Multiple containers 26 with the same associated information can be added this way, one after another. Performance feedback information can alert the user when a container has been successfully associated. Of course, other methods can be used to associate asset tag ID 90 with a particular container 26, such as by manually inputting asset tag ID 90 into host 46.

Each field for actual and expected dispensation rates 224 and 226 may reflect multiple dispensation rates corresponding to different orientations 62 and 64 (FIG. 3) recognized for a container 26. In particular, FIG. 10 depicts a separate actual dispensation rate 224' for intermediate orientation 64 (labeled as the 90° rate in FIG. 10) and a separate actual dispensation rate 224" for pour orientation 62 (labeled as the 135° rate in FIG. 10). Likewise, FIG. 10 depicts a separate expected dispensation rate 226' for intermediate orientation 64 (labeled as the 90° rate in FIG. 10) and a separate expected dispensation rate 224" for pour orientation 62 (labeled as the 135° rate in FIG. 10).

Actual dispensation rates 224 may initially be set equal to the respective expected dispensation rates 226, but will typically diverge, as discussed below, as process 198 operates over time in conjunction with the operation of premises 20. Alternately, the user can also manually test pour spouts to determine pour rate and input that actual rate into the system. Also, the system can come preprogrammed with different actual pour rates for different products. Actual dispensation rates 224 become more accurate than expected dispensation rates 226 due to this divergence.

Expected dispensation rates 226 characterize the rates at which a dispensation controller 50 (FIG. 2) should dispense product 56 with container 26 in the represented orientations. Expected dispensation rates 226 may be viewed as being a standard or default dispensation rates. For example, an expected dispensation rate may be around 30 ml per second for a pour orientation 62. But different dispensation controllers 50 may actually operate at different rates and may be the source of substantial variability. And, additional sources of variability may be due to viscosity, temperature, barometric pressure, amount of product 56 in container 26, the shape of container 26, and the like. Thus, actual dispensation rates 224 differ from expected dispensation rates 226, as discussed below, to account for these sources of variability.

In the preferred embodiment, the same expected dispensation rate 226 is used for all dispensation controllers 50 based on an average actual dispensation rate for similar dispensation controllers. The system can be preprogrammed with expected dispensation rates 226 and/or a user can manually input expected dispensation rates 226.

Image identifiers 227 may include one or more graphic images of the subject container 26 arranged or otherwise connected with other parameters so that different levels 60 (FIG. 3) of product 56 may be graphically displayed relative to the graphic image. These images are included in a collection of different images for the different shapes and sizes of containers 26 that may be in use within premises 20.

Container parameters 228 may include a default initial amount value 222 and cost 223 that describe a full container 26, and other parameters that characterize the container 26, asset tag 48, and/or product held therein.

Referring briefly back to FIG. 9, after task 214, a task 230 updates a data structure used to track financial transactions associated with dispensation events. Such a data structure is exemplified by a transaction table 232 depicted in FIG. 11.

FIG. 11 shows a transaction table 232 that depicts exemplary relationships between various data items used in process 198. Each transaction has an association among a transaction ID 234, the tag ID 90 for the subject asset tag 48, the product ID 218 of the product or products that are included in the transaction, a time stamp item 236 that reflects the date and time-of-day (T.O.D.), the 90° and 135° duration values 146 and 148 conveyed by the subject event record 96" that describes the dispensation for the transaction, a total actual amount 238 that describes the actual amount of product dispensed, a cost of goods sold for the transaction 239, a total expected amount 240 that describes the expected amount of product dispensed, and an expected revenue value or sales price 242 for the transaction.

Task 230 desirably opens a new association in transaction table 232 and assigns a unique transaction ID 234 to the association. Task 230 may also populate the association with the tag ID 90 and the 90° and 135° duration values 146 and 148 obtained from the subject event record 96". In addition, task 230 may also populate the association with a time stamp 236 that describes when the event was detected at the subject asset tag 48, and the product ID 218 obtained from the corresponding association in tag/container table 216.

And, task 230 may also calculate the total actual amount 238 and total expected amount 240, respectively, using actual dispensation rates 224' and 224" and expected dispensation rates 226' and 226" from the corresponding association in tag/container table 216. These calculations essentially multiply the respective dispensation rate times the duration. As discussed above, desirably each dispensation rate includes a 90° or intermediate rate for the duration spent in intermediate orientation 64 and a 135° or pour rate for the duration spent in pour orientation 62, so that the respective total amounts are the sum of the amounts calculated for each individual orientation. In the preferred embodiment, the expected and actual dispensation rates applied for intermediate orientation 64 are determined empirically to be a predetermined percentage (e.g., 60%) of the expected and actual dispensation rates applied for pour orientation 62. Nothing requires the predetermined percentage to be the same for different types of containers 26 and/or different styles of dispensation controllers 50.

Those skilled in the art will appreciate that the total actual amounts 238 and total expected amounts 240 may be based on their respective actual and expected rates 224 and 226 without explicitly using actual and expected rates 224 and 226. For example, actual rates 224 may be specified as scale factors to be multiplied by the corresponding expected rates 226, or vice versa. Thus, task 230 may calculate total expected amount 240 using expected rates 226, then implicitly calculate total actual amount 238 using the total expected amount 240 and a scale factor. A wide variety of such mathematical manipulations and others which produce equivalent results are contemplated in connection with task 230 and with other tasks discussed herein.

Task 230 may also calculate cost 239 using the total actual amount 238 to allocate a portion of cost data 223 (FIG. 10) to this transaction. The allocated portion is substantially the same as the proportion of total actual amount 238 to initial amount 222.

Referring back to FIG. 9, after task 230 a task 244 obtains the sales price or expected revenue 242 (FIG. 11) for the transaction, and populates the subject association in transaction table 232 with the sales price 242. In one embodiment, sales price 242 is calculated based solely on total expected amount 240 (FIG. 11) determined using expected dispensation rates 226 (FIG. 10). Thus, if a bartender intends to pour a 30 ml drink, and does pour a drink for precisely one second using a pour spout that should pour at a rate of 30 ml per second, an expected amount of 30 ml is assigned to the transaction. A price (e.g., expected revenue) is assigned to the transaction that is appropriate for a 30 ml drink. In fact, the actual amount poured may vary by as much as ±50% due to variance factors that will be more accurately reflected using the actual dispensation rate. But expected revenue is better predicted based upon the bartender's intent and actions than on factors such as pour spout variability, viscosity, and other factors that may be beyond the bartender's field of awareness.

Figures 12, 13, 15:
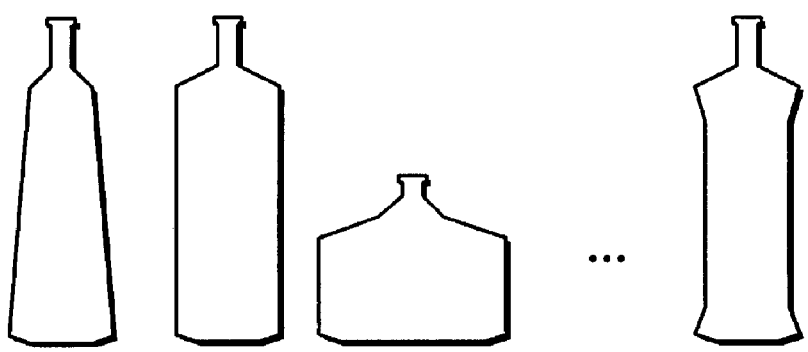
FIG. 12 shows a price schedule that depicts exemplary relationships between various data items used in the process of FIG. 9.
FIG. 13 shows a switch table that depicts exemplary relationships between various data items used in the process of FIG. 9.
FIG. 15 shows a representation of an exemplary collection of diverse images that may be maintained by the host of FIG. 8 in one embodiment of the present invention.

FIG. 12 shows a price schedule 246 that depicts exemplary relationships between various data items used in process 198. Price schedule 246 depicts an exemplary data structure with an association between product ID 218, a time-of-day range 248, expected dispensing range 240' of dispensed product 56, user input code 114, and a resulting price 250. As reflected in FIG. 12, a price 250 may be determined from the product ID for the subject container 26, the time of day when the product 56 was dispensed, and the expected dispensing range 240'. Different prices may be assigned to different products, the same product sold at different times of the day, and to different expected amounts of product. Price schedule 246 is desirably set up by a manager of premises 20 using a suitable user interface prior to the performance of process 198.

In another embodiment, sales price 242 is calculated based solely on user input 114. In this embodiment, a prior switch event for the subject asset tag 48 records a user input item 114 that is configured to communicate the price point (i.e., sales price 242) for a dispensation event. The management of premises 20 may associate an expected dispensing range 240 with each sales price 242.

FIG. 13 shows an exemplary switch table 252 in which the prior switch event record 96' has most likely been recorded. Switch table 252 establishes an exemplary relationship between tag ID 90, event number 108, time stamp 236, and user input code 114. Thus, task 244 may evaluate switch table 252 to obtain the user input code for the switch event that occurred prior to or during the subject dispensation event. Desirably, the appropriate entry in table 252 reflects a switch event record 96' that has the same tag ID 90 as the current dispensation event record 96", has an event number 108 one less than the event number 108 of the current dispensation event record 96", and has a time stamp 236 within a short timing window prior to or coincident with the time stamp 236 of the current dispensation event record 96". Task 244 may test for the existence of an appropriate entry in table 252 and invoke a suitable error-handling routine if an appropriate entry is not found. When an appropriate entry is found in table 252, the user input code 114 from the entry may be extracted and used with price schedule table 246 to obtain a price for the product ID 218 and time-of-day 248 that describe this transaction. Task 244 may then use this price as the sales price 242. Each sales price 242 may be associated with an expected dispensing range 240.

In yet another embodiment, task 244 calculates sales price 242 based on both total expected amount 240 and user input 114. Thus, the techniques discussed above are combined through price schedule 246 to determine a sales price 242 to associate with the transaction.

After task 244 calculates sales price 242 for the individual transaction, a task 254 records the revenue for the transaction by saving the sales price 242 calculated above in task 244 in table 232. This recordation is equivalent to ringing up the transaction. And, in one embodiment, task 254 may transmit sales price 242 to a register 30 (FIG. 1) that may be in data communication with host 46, where the transaction may also be rung-up.

After task 254, a task 255 configures and provides pouring-accuracy performance feedback information through information-presentation system 196 (FIG. 8), or the equivalent. In configuring performance feedback information, task 255 may determine a dispensing range for the dispensation. As an example, a drink that ideally includes 30 ml of a particular product 56 may have an expected dispensing range of 27-33 ml. In one embodiment, the dispensing range may be selected as the expected dispensing range 240' of price schedule 246 (FIG. 12) for a user input code 114 that has been provided to signify the user's intent in dispensing product 56. In another embodiment, expected dispensing range 240' may be selected as being the closest expected dispensing range 240' within price schedule 246 to the total expected amount 240 (FIG. 11) calculated for the dispensation. Expected dispensing ranges 240' are established by the management of premises 20 in setting up price schedule 246 for different types and sizes of drinks that may be dispensed.

Task 255 may also evaluate the total expected amount 240 against the expected dispensing range 240'. In particular, the total expected amount 240 is evaluated rather than the total actual amount 238 (FIG. 11) to enhance the use of the performance feedback information as a training tool. The feedback will reflect only the variability factors that are within a bartender's control.

Task 255 then desirably presents the pouring-accuracy performance feedback information in a humanly perceivable form as a training aid for the user. In one embodiment, a display indicates a score that compares the total expected amount 240 that was dispensed relative to the expected dispensing range 240', and a warning is emitted if the total expected amount 240 is out-of-range. And, the performance feedback information may alternately be accumulated over a number of dispensations and provided as a report describing the overall performance of the user as well as pouring-accuracy performance for individual dispensations. Performance feedback information can display other information, such as expected pour amounts 240 and/or actual pour amounts 238. Displaying expected pour amounts 240 on a real-time display desirably may assist bartenders in improving their pouring accuracy. Of course, those skilled in the art will appreciate that these are but a couple of a wide variety of different ways that the performance feedback information may be presented. In addition, task 255 may also present the total actual amount 238 along with other factors, such as cost 239, for comparison purposes. Moreover, task 255 may evaluate whether actual pour amounts 238 vary from expected pour amounts 240 by a predetermined value that may be adjusted by the user. If the predetermined value is exceeded, a warning may be presented. This information may also desirably be used to determine the accuracy of dispensation controllers 50.

Next, a task 256 accumulates the 90° and 135° degree duration values 146 and 148 conveyed by the subject event record 96" into accumulated intermediate and pour durations 221' and 221" for storage in table 216 (FIG. 10). Accordingly, accumulated durations 221 collectively describe the total amount of time the subject container 26 has spent in the intermediate and pour orientations 64 and 62 since being opened. The accumulations of duration values 146 and 148 results in an adjustment to inventory data. As discussed below, inventory for each open container 26 represents the initial amount 222 (FIG. 10) for the container 26 minus the accumulated durations 221 times the respective actual dispensation rates 224. By adjusting the accumulated durations 221, inventory data are likewise adjusted. Of course, those skilled in the are will appreciate that inventory data may also be adjusted by subtracting individual pour amounts from an initial amount.

After task 256 program flow loops back to task 204 to process another event record 96. In the processing of event records 96, task 212 will occasionally encounter an event record 96 that is not a dispensation event record 96". In this situation, a query task 258 determines whether the event record describes a switch event.

When task 258 detects a switch event record 96', a task 260 is performed to update the associations set forth in tag/container table 216 (FIG. 10). In particular, event number 108 and transmit time 220 are updated to reflect the data conveyed by the newly-received switch event record 96'. Then, a task 262 updates switch table 252 (FIG. 13) by adding a new entry which records the tag ID 90, event number 108, an appropriate time stamp 236, and a switch type 112/user input code 114 as conveyed by the subject event record 96'. After recording the event record 96' in table 252 at task 262, a query task 264 evaluates the type of switch event being described. If a user input (UI) type of switch event is being described, then program flow loops back to task 204 to process the next event record. The user input has been recorded in switch table 252 and may be used as discussed above when processing a concurrent or subsequent dispensation event record 96".

If task 264 encounters a dismount (D) type of switch event, then a query task 266 is performed. A dismount switch event describes the removal of asset tag 48 from its container 26. At this point, process 198 has gained the knowledge that the subject container 26 is actually empty. An opportunity is provided to reconcile the inventory usage data being collected for this container 26 with actual occurrences. And, an opportunity is provided to calculate the actual dispensation rate for dispensation controller 50. Accordingly, task 266 determines whether the subject container 26 reconciles. In particular, task 266 may calculate the total amount of product dispensed from container 26 using accumulated durations 221 from table 216 (FIG. 1). These durations 221 are applied to the actual dispensation rates 224 to determine the actual amount of product 56 dispensed from container 26. This value should match initial amount 222 when container 26 is empty, to within a predetermined tolerance. If a match is found, then the subject container 26 reconciles.

When container 26 reconciles a record is made of this fact, and a task 268 is performed. Task 268 updates actual dispensation rate 224 being maintained for the subject asset tag 48 and container 26 in table 216 (FIG. 10). Task 266 may simply divide the initial amount 222 by the accumulated pour duration 221" plus a predetermined percentage of the accumulated intermediate duration 221' to obtain the actual dispensation rate 224" for pour orientation 62, then apply the predetermined percentage to this pour orientation rate 224" to obtain the intermediate dispensation rate 24'.

In one embodiment, these new actual dispensation rates are saved in actual rate fields 224 of table 216. In another embodiment, the old actual dispensation rates 224 are changed only a fraction of the difference between these new actual dispensation rates and the old actual dispensation rates so that the actual dispensation rates 224 convey values that are relatively stable from container 26 to container 26.

In yet another embodiment, separate filters are constructed for actual intermediate and actual pour rates 224' and 224", and actual intermediate and actual pour rates 224' and 224" are adjusted independently of each other so that each converges to a more accurate value than is expressed by the corresponding expected intermediate and expected pour rates 226' and 226". In yet another embodiment, only actual pour rate 224" is adjusted in task 268. Of course, any of a wide variety of filtering techniques may be applied in adjusting actual dispensation rates 224' and/or 224" so that they more accurately describe the actual dispensation of the subject product 56 from the subject container 26 without departing from the spirit and scope of the present invention. And actual dispensation rates 224 may be adjusted by adjusting a scale factor which is applied to expected dispensation rates 226 or by other variables that, through mathematical manipulations, achieves equivalent results. Of course, user feedback may be provided to inform the user that the actual dispensation rate has changed and how much it has changed.

Accordingly, task 268 causes actual dispensation rates 224 to differ from expected dispensation rates 226. Due to the adjustment of actual dispensation rates 224, expected dispensation rates 226 are relatively static compared to actual dispensation rates 224, but actual dispensation rates 224 become increasingly accurate as time passes. Task 268 causes an automatic self-calibration of actual dispensation rates 224. Task 268 compensates for different physical characteristics of different spouts that cause different pour rates, different viscosities of different products 56, different shapes of different containers 26, different amounts of product 56 in a container, and different environmental factors, such as barometric pressure and temperature.

A dispensation-rate ratio is the fraction for actual intermediate dispensation rate 224' divided by actual pour dispensation rate 224". Since task 268 adjusts an actual dispensation rate 224 for a specific dispensation controller 50 (FIG. 2), container 26, and product 56, this dispensation-rate ratio will differ for different asset tags 48. Table 216 supports the specification of different dispensation-rate ratios for different asset tags 48 by providing separate fields for each asset tag 48. Of course, no dispensation-rate ratio needs to be explicitly specified since, in the preferred embodiment, separate fields are provided for each asset tag's actual intermediate dispensation rate 224' and actual pour dispensation rate 224". After task 268, program flow loops back to task 204 to process another event record 96.

When task 266 determines that container 26 did not reconcile, any of a variety of situations may have occurred. In one scenario, an asset tag 48 and integrated dispensation controller 50 may have been removed accidentally or intentionally from a container 26 before the container 26 was empty. This scenario should be flagged because it affords an opportunity to dispense product 56 without the dispensation being monitored by asset tag 48. In another scenario, a dispensation controller 50 may have malfunctioned so as to be dispensing at a substantially different rate. This scenario should also be flagged because it indicates that customers are not getting the intended amounts of product 56. In yet another scenario, intentional tampering, such as by siphoning, may have caused product 56 to disappear without being monitored by asset tag 48. Again, this scenario should be flagged so that management is made aware.

In these and other scenarios, a task 270 causes a suitable warning to be presented through information-presentation system 196 (FIG. 9). The warning provides information indicating that the subject container 26 did not reconcile so that an audit may be performed to determine the specific problem and take corrective action. After task 270, program flow loops back to task 204 to evaluate the next event record 96.

In the embodiment described above, the indication that a container 26 is empty is inferred from the removal of asset tag 48 from a container 26. But in other embodiments other techniques may be employed to gain this "container empty" knowledge. In one such embodiment, a user may simply press a button on asset tag 48 or on a register 30 to signal that a container 26 is empty. And, the container 26 need not be a bottle but may, for example, be a beer keg having a tap handle associated therewith or any other type of container from which bulk product may be dispensed. In these other embodiments, the above-discussed features related to container-level reconciliation, updating actual dispensation rates, and the like provide the same or similar benefits.

The container-level reconciliation feature permits premises 20 to forego the occasional manual inventory procedure because the inventory-taking function is being continuously performed on a container-by-container basis. And, when a container 26 fails to reconcile, the resulting warning is presented with container-level specificity and proximate in time to the occurrence of any problem that resulted in the warning. This degree of specificity in providing warnings makes a good management tool. Moreover, the container-level reconciliation feature obviates any need for more expensive monitoring devices that might be able to more directly monitor product levels 60 (FIG. 3) within containers 26.

When task 264 discovers a switch event record 96' describing a mount event (M), then an asset tag 48 has been mounted on a container 26. An inference is made that a new container 26 is being opened. Accordingly, a task 272 is performed to close the previous Tag/container record in table 216 (FIG. 10) and open a new record. Task 272 initializes this new record based on the assumption that a new container of the same size and holding the same product is being opened. For this new record in table 216, task 272 clears the accumulated intermediate and pour durations 221 and sets the initial amount 222 to a default value for a full container 26. The tag ID 90, transmit time 220, event number 108, product ID 218, expected and actual rates 226 and 224, image ID 227, and container parameters 228 are copied from the old record. After task 272, program flow loops back to task 204 to evaluate another event record 96.

Of course, nothing requires an asset tag 48 and/or integrated dispensation controller 50 be mounted back on an identical container 26. When this situation occurs, a user may enter the appropriate identifying container data at host 46. And, nothing requires the mounting event to signify the opening of a new container 26. In alternate embodiments, other signals may be employed. For example, a key on register 30 or specific user input at asset tag 48 or host 46 may also provide this signal.

When task 258 determines that an event record 96 does not describe a switch event, program control loops back to task 204 to evaluate another event record 96. As indicated by ellipsis in FIG. 9, any number of additional tasks may also be included to test for and process other types of events that may be described by event records 96.

Eventually, task 204 will determine that it has evaluated all event records 96 that had been collected above in task 200. When this situation occurs, a query task 274 is performed to determine whether any asset tag 48 failed to meet its transmit schedule. In other words, task 274 determines whether it is unable to receive data from any asset tag 48. This situation may result from an asset tag 48 failure or from someone removing a container 26 from the monitored area within premises 20. Task 274 may, for example, evaluate all last-transmit data items 220 in tag/container table 216. If the asset tag 48 follows a schedule where event transmissions must take place at least every 20 minutes, even when no events are being detected by the asset tag 48, then task 274 may conclude that process 198 is unable to receive data from that asset tag 48 when last transmission 220 is, for example 60 minutes old. Beacon transmissions are desirably scheduled to occur more frequently tan event transmissions. If a beacon transmission is scheduled to occur every three minutes, then task 274 may conclude that process 198 is unable to receive data from that asset tag 48 when the last transmission 220 is, for example, 9 minutes old. If any last transmit time 220 is so stale as to indicate that the corresponding asset tag 48 has failed to meet its transmit schedule, then a task 276 is performed. The management of premises 20 can define parameters under which an asset tag 48 has failed to meet its transmission schedule.

Task 276 causes a suitable warning to be presented through information-presentation system 196 (FIG. 9). The warning may, for example, provide information indicating that a specified asset tag 48 has failed to meet its transmission schedule so that an audit of the corresponding container 26 may be performed.

Following task 276, and when task 274 fails to detect any asset tags 48 that could not transmit on schedule, process 198 concludes. But process 198 may be performed at any time, and may be initiated again as soon as it is finished.

Figure 14:
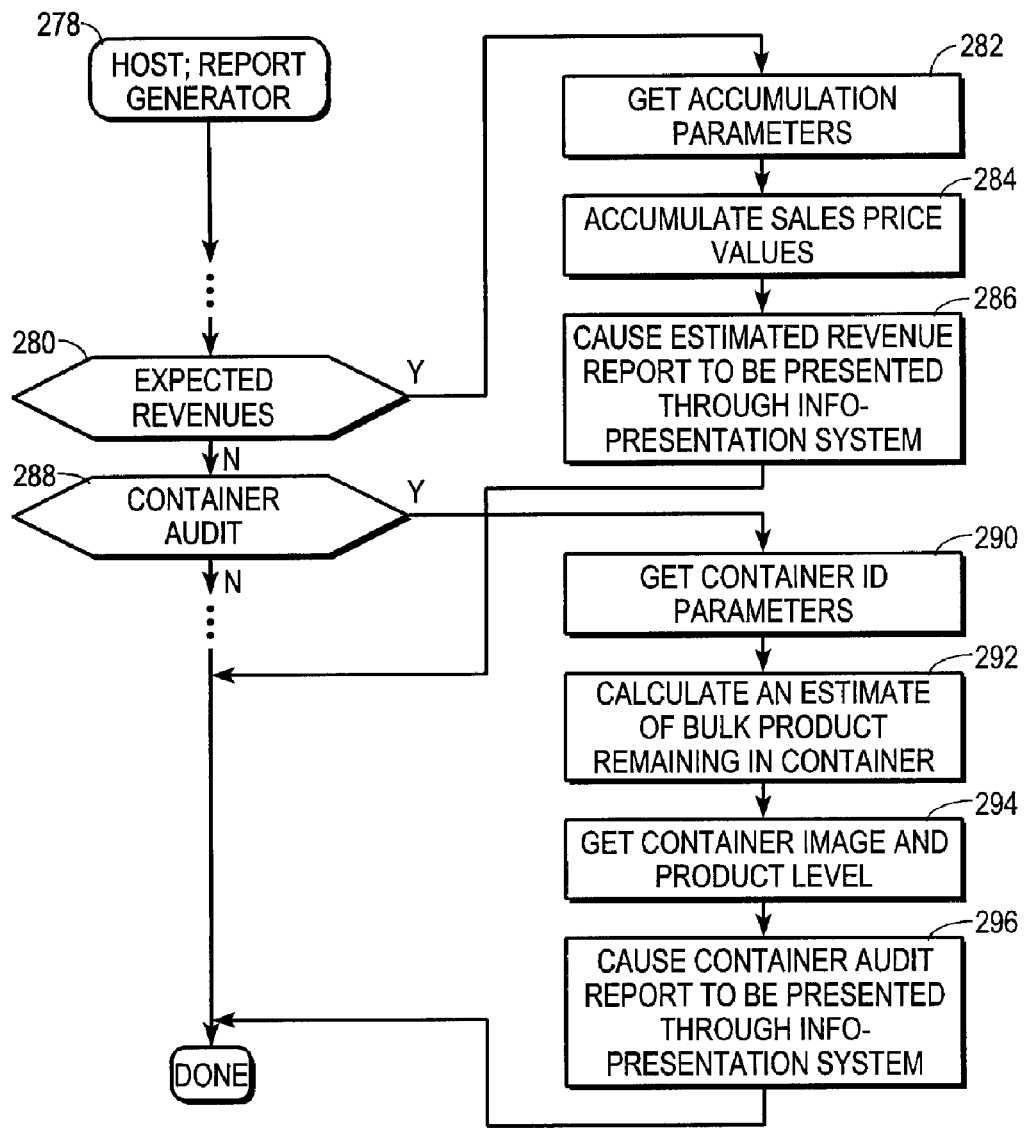
FIG. 14 shows a flow chart of a report generator process performed by the host of FIG. 8 in one embodiment of the present invention.

FIG. 14 shows a flow chart of a report generator process 278 performed by host 46 in one embodiment of the present invention. Report generator process 278 may be initiated by a user of host 46 to obtain specific data that will be useful in performing a specific type of audit.

Process 278 may include any number of tasks that lead to the generation of any number of reports which are known to those skilled in the art of inventory and financial management systems. In addition, one of the reports generated by process 278 is initiated at a query task 280, which detects a request for a report concerning expected revenues 242. When such a report is requested, a task 282 obtains the accumulation parameters over which expected revenues 242 are to be accumulated. In a typical scenario, the accumulation parameters will be a particular period of time, such as a shift. But other accumulation parameters may focus on particular containers and the like.

Next, a task 284 accumulates sales prices or expected revenues 242 in accordance with the specified accumulation parameters to produce at least one accumulated sales price value. Task 284 may simply add all expected revenues 242 from table 232 (FIG. 11) that are included in records that match the accumulation parameters. After task, 284, a task 286 causes an estimated revenue report to be presented through information-presentation system 196 (FIG. 9), and program flow exits process.

At this point, a user may perform an audit of accumulated expected revenue against the actual revenue collected and presumably present in one or more of registers 30. Ideally, the accumulated expected revenue should nearly match the actual collected revenues, but mistakes, errors, returns, spills, and the like may cause variances. Of course, the system may provide for manual adjustments for known mistakes, errors, returns, spills, and the like so that an audit might then detail such manual adjustments, but further variances would then be unexplained. For the efficient operation of premises 20 management should be aware of the various causes of variances.

Another of the reports generated by process 278 is initiated at a query task 288, which detects a request for a report suitable for an audit of a container 26. When such a report is requested, a task 290 gets parameters which identify the container or containers 26 for which a container-audit report is being requested. Next, a task 292 calculates an estimate of the bulk product 56 remaining in the containers 26 identified above in task 290. Task 292 desirably bases its calculations on the accumulated duration values 221 and the actual dispensation rates 224 for the subject containers 26, as recorded in tag/container table 216 so that the most accurate characterization of inventory will be presented.

Then, a task 294 is performed to select a graphic image for each selected container 26 from a collection of diverse graphic images and to get a product level 60 for association with the selected graphic image. Premises 20 may include a wide variety of different products 56 held in a wide variety of differently shaped containers 26. Desirably, task 294 selects a graphic image that bears a likeness of the container 26 identified above in task 290.

FIG. 15 shows a representation of an exemplary collection of diverse images that may be maintained by host 46. Of course, this collection is most likely maintained as computerized data that instructs a display or other component of information-presentation system 196 to form the image, rather than images themselves. Desirably, an identifier (i.e., image ID 227) for the one of the collection of diverse images that most closely resembles the actual subject container 26 was specified when the record for this container was established. Task 294 gets the graphic images of the subject containers 26 and respective graphic product level data corresponding to the calculated estimations from task 292.

In one embodiment of the present invention, image ID 227 includes, or links to, a set of images of various containers 26 from which different types of products 56 are dispensed. In addition, image IDs 227 include, or link to, information which characterize different levels of product in a specified container 26. For example, 101 images may be stored for each container 26 from which product is dispensed. Each image could then graphically indicate different levels of product in the container in 1% increments, from 0% through 100%. Of course, increments other than 1% may alternatively be used. The images and associated product levels may be determined empirically. Alternatively, an equation or table may be used to indicate where to place a product fill line 60 (FIG. 3) on an image of the container 26, and software can overlay the fill line on the container's image at a location determined in accordance with a quantity of product 56 calculated to be remaining in container 26. In one embodiment, a portable or handheld computer, such as a PDA, may be used to conduct audits of containers 26 at the location where the containers 26 are located, but this is not a requirement.

Following task 294, a task 296 causes one or more graphic images to be presented through information-presentation system 196 (FIG. 8), and program flow exits process 278. Of course, nothing prevents other characterizations of the estimated product level, such as textual or numeric descriptions for percent of full or for weight, to be presented as well.

Figure 16:
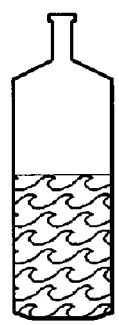
FIG. 16 shows an exemplary graphic image that may be presented by a container audit report generated through the process of FIG. 14.

FIG. 16 shows an exemplary graphic image that may be presented during task 296 by a container audit report generated through process 278.

In one embodiment, process 278 may immediately restart after completion, and task 288 may then immediately detect another or an ongoing request for an audit of a specified container. In this embodiment, the audit report is desirably presented on an electronic display, such as a display of a hand-held computer. Thus, tasks 290, 292, 294, and 296 are continuously repeated. Each iteration of task 292 generates another estimate of bulk product, taking into account any intervening adjustments recorded in tag/container table 216. This causes the estimates calculated in each iteration of task 292 to track dispensations of bulk product from its container in real time. Consequently, the displayed audit report is updated in real time as product is dispensed. Both graphical images and textual or numeric descriptions can track the dispensations. The real time update is useful for providing bartender feedback and as a sales tool for demonstration purposes.

In summary, the present invention provides an improved system and method for managing the dispensation of a bulk product. A system and method are provided in which reasonably accurate and complete data are automatically collected concerning inventory usage. A system and method are provided in which inventory usage data are integrated with revenue data. A system and method are provided in which system expense is held to a low level so that an organization is encouraged to collect inventory usage data for a large portion of its inventory. A system and method are provided in which situations are detected and flagged where a likelihood of incomplete and/or inaccurate data exists. And, a system and method are provided where expected and actual inventory usage may be reconciled on a container-by-container basis, where expected revenue may be audited against actual revenue as needed, and/or where warning information is presented when aspects of the knowledge base appear incomplete so that suitable audits may then take place.

Although preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the processes discussed herein may be configured in a wide variety of equivalent ways and that the functions described herein may be performed using different tasks and different task sequences. Likewise, the data structures discussed herein may be implemented in a number of different forms and need not precisely follow the structure of the tables discussed above. These and other changes and modifications are intended to be included in the scope of the present invention.

What is claimed is:

1. A system for managing a dispensation of a bulk product (56) from a container (26) in which said bulk product is stored and from which said bulk product is dispensed by tilting said container away from an inactive orientation (58), said system comprising:
   an asset tag (48) coupled to said container, said asset tag having a first tilt sensor (74) configured to detect an orientation for said container of greater than a first angle (65) displaced from said inactive orientation, said asset tag having a second tilt sensor (76) configured to detect an orientation for said container of greater than a second angle (63) displaced from said inactive orientation, said second angle being greater than said first angle, said asset tag being configured to generate first data (146) describing a duration said container spends at said orientation greater than said first angle and second data (148) describing a duration said container spends at said orientation greater than said second angle, and said asset tag being configured to electronically transmit said first and second data;
   a computer (46) remotely located from said asset tag and configured to obtain said first and second data transmitted from said asset tag, said computer being configured to calculate a total amount (238) of bulk product dispensed in response to said first and second data; and
   an information-presentation system (196) in data communication with said computer, said information-presentation system being configured, in cooperation with said computer, to present information describing said total amount dispensed.

2. A system as claimed in claim 1 wherein:
   said computer calculates said total amount in response to said first and second data being respectively applied to first and second dispensation rates (224', 224"), said first and second dispensation rates exhibiting a dispensation-rate ratio;
   said system manages dispensations of a variety of different bulk products from a variety of different containers, where a different asset tag is coupled to each of said containers; and
   said computer is configured so that different dispensation-rate ratios are associated with different asset tags.

3. A system as claimed in claim 1 wherein said asset tag is configured to emit a warning (138) when said container spends greater than a predetermined duration at an angle between said first and second angles.

4. A system as claimed in claim 1 wherein said second angle is between 20° and 60° greater than said first angle.

5. A system as claimed in claim 4 wherein said first angle is approximately 90° and said second angle is 135°±15°.

6. A system as claimed in claim 1 wherein:
   said computer is configured to calculate said total amount in response to said first and second data being respectively applied to first and second actual dispensation rates (224', 224"); and
   said computer is configured to adjust (268) at least said second actual dispensation rate (224") in response to said container becoming empty to improve accuracy of said second actual dispensation rate.

7. A system as claimed in claim 6 wherein:
   a server dispenses said bulk product by tilting said container;
   said total amount is a total actual amount (238);
   said computer is configured to calculate a total expected amount (240) in response to said first and second data being respectively applied to first and second expected dispensation rates (226', 226"), said first and second expected dispensation rates being relatively static compared to said second actual dispensation rate; and
   said computer and said information-presentation system are mutually configured to present information describing said total expected amount.

8. A system as claimed in claim 7 wherein said computer is configured to determine a sales price (250) for said dispensation in response to said total expected amount.

9. A system as claimed in claim 1 wherein said first and second angles are substantially solid angles.

10. A system as claimed in claim 1 additionally comprising:
    a plurality of receivers (38), each of which is configured to receive said first and second data transmitted from said asset tag; and
    a data collection unit (42) configured to receive said first and second data from more than one of said receivers and to transmit said first and second data to said computer.

11. A computer-assisted method for managing dispensations of bulk products (56) from containers (26), said method comprising:
    detecting (212), at a computer (46), a dispensation of one of said bulk products from one of said containers;
    obtaining, at said computer, an expected dispensation rate (226) and an actual dispensation rate (224) for said one of said containers;
    adjusting, at said computer, inventory data (256, 292) in response to said actual dispensation rate to account for said dispensation; and
    providing performance feedback information (255) about said dispensation through an information-presentation system, said performance feedback information being configured in response to said expected dispensation rate.

12. A method as claimed in claim 11 wherein said expected dispensation rate is relatively static compared to said actual dispensation rate.

13. A method as claimed in claim 11 additionally comprising recording a sales price (242) for said dispensation in response to said expected dispensation rate.

14. A method as claimed in claim 13 wherein said recording activity comprises establishing said sales price in response to said expected dispensation rate and a time of day (236) when said dispensation of said one bulk product occurred.

15. A method as claimed in claim 13 additionally comprising:
accumulating sales prices for a plurality of dispensations to produce an accumulated sales price value (284); and
presenting (286) said accumulated sales price value through said information-presentation system so that an audit may be performed against actual revenue collected.

16. A method as claimed in claim 11 additionally comprising recording a cost (239) for said dispensation, said cost being calculated in response to said actual dispensation rate.

17. A method as claimed in claim 11 wherein:
said inventory-data adjusting activity comprises calculating (292) an estimate of said one bulk product remaining in said one container in response to said actual dispensation rate; and
said method additionally comprises presenting (296) said estimate through said information-presentation system so that an audit of inventory in said one container may be performed.

18. A method as claimed in claim 17 wherein said presenting activity presents a graphic image of said one container and a graphic depiction of a product level relative to said image of said one container, said product level being responsive to said estimate.

19. A method as claimed in claim 18 wherein:
said detecting activity comprises receiving data identifying said one container (90); and
said presenting activity selects said graphic image from a collection of diverse graphic images in response to said one-container-identifying data.

20. A method as claimed in claim 11 wherein:
said dispensation of said one bulk product from said one container results from tilting said one container away from an inactive orientation (58); and
said detecting activity comprises receiving first data (146) which describe a first duration during which said one container is tilted greater than a first angle (65) away from said inactive orientation and second data (148) which describe a second duration during which said one container is tilted greater than a second angle (63) away from said inactive orientation, wherein said second angle is greater than said first angle.

21. A method as claimed in claim 20 wherein
said actual dispensation rate is a second actual dispensation rate (224") and is responsive to said second data;
a first actual dispensation rate (224') is responsive to said first data;
said inventory data for said one container is responsive to said first and second actual dispensation rates;
said expected dispensation rate is a second expected dispensation rate (226") and is responsive to said second data;
a first expected dispensation rate (226') is responsive to said first data; and
said server feedback information is responsive to said first and second expected dispensation rates.

22. A method as claimed in claim 21 wherein said one bulk product is a beverage, said one container is a bottle, and said dispensation results from tilting said bottle away from an upright orientation.

23. A method as claimed in claim 11 wherein:
said detecting activity comprises receiving duration data (146, 148) and user input data (112, 114) from an asset tag (48) coupled to said one container, said duration data describing a duration during which said one container is tilted greater than a predetermined angle away from an inactive orientation, and said user input data being collected from a user interface (54) of said asset tag;
said method additionally comprises determining a dispensing range (240') in response to said user input; and
said performance feedback information is configured in response to said duration data and said dispensing range.

24. A method as claimed in claim 11 wherein:
said detecting activity comprises receiving duration data (146, 148) from an asset tag (48) coupled to said one container, said duration data describing a duration during which said one container is tilted greater than a predetermined angle away from an inactive orientation;
said method additionally comprises determining a dispensing range (240') in response to said duration data; and
identifying a sales price in response to said dispensing range.

25. A method as claimed in claim 11 wherein said detecting activity comprises:
receiving, at a plurality of receivers (38), dispensation data from an asset tag coupled to said one container;
collecting said dispensation data from said plurality of receivers at a data collection unit (42); and
communicating said data from said data collection unit to said computer.

26. A method as claimed in claim 25 additionally comprising:
supplying power to said plurality of receivers from said data collection unit; and
supplying power to said data collection unit from a public power distribution network (178) and from a battery (182).

27. A method as claimed in claim 11 additionally comprising adjusting (268) said actual dispensation rate from time to time to improve accuracy of said actual dispensation rate so that said actual dispensation rate becomes more accurate than said expected dispensation rate.

28. A computer-assisted method for managing dispensations of bulk products (56) from containers (26), said method comprising:
maintaining, at a computer (46), a collection of graphic images, wherein said graphic images correspond to said containers;
detecting (212), at said computer, dispensations of said bulk products from said containers;
adjusting (256, 292), at said computer, inventory data for said containers in response to said dispensations;
receiving (288), at said computer, a request for inventory audit information about one of said containers;
selecting one of said graphic images in response an identity (227) of said one container; and
providing said requested inventory audit information through an information-presentation system (196) in data communication with said computer, said inventory audit information being configured to depict said one graphic image and to depict a product level (60) relative to said one graphic image, said product level being responsive to said inventory data for said one container.

29. A method as claimed in claim 28 wherein said bulk products are beverages, said containers are bottles, said graphic images are images of said bottles.

30. A method as claimed in claim 28 additionally comprising:
determining, at said computer, dispensation rates (224) for said containers; and adjusting (268) said dispensation rates from time to time to improve accuracy of said dispensation rates.

31. A method as claimed in claim 30 wherein:
said dispensation rates are actual dispensation rates;
said determining activity also obtains expected dispensation rates (226) for said containers; and
said method additionally comprises providing performance feedback information about said dispensations through said information-presentation system, said performance feedback information being configured in response to said expected dispensation rates.

32. A method as claimed in claim 31 wherein said expected dispensation rates are relatively static compared to said actual dispensation rates.

33. A method as claimed in claim 28 wherein:
said dispensations of said bulk products from said containers result from tilting said containers away from inactive orientations (58);
said detecting activity comprises receiving, for each dispensation, first data (146) which describe a first duration during which said one of said containers is tilted greater than a first angle (65) away from said inactive orientation and second data (148) which describe a second duration during which said one container is tilted greater than a second angle (63) away from said inactive orientation, wherein said second angle is greater than said first angle; and
said adjusting activity adjusts, for each dispensation, said inventory data in response to said first and second data.

34. A method for managing a dispensation of a bulk product (56) from a container (26), said method comprising:
equipping said container with an asset tag (48);
collecting (104) user input at said asset tag, said user input indicating a sales price of said bulk product to be dispensed;
collecting (134, 135) dispensation data (146, 148) at said asset tag, said dispensation data describing a quantity of said bulk product dispensed from said container during a dispensation;
evaluating (136, 255) said dispensation data and said user input to determine whether a quantity of said bulk product dispensed is within a dispensation range (240) for said sales price; and
presenting (138, 255) humanly perceivable information which reflect results of said evaluating activity.

35. A method as claimed in claim 34 wherein:
said sales price is associated with an intended quantity to be dispensed from said container; and
said presenting activity causes said asset tag to emit a warning when said dispensation data indicate a quantity greater than said intended quantity has been dispensed.

36. A method as claimed in claim 34 wherein said method additionally comprises ringing-up (254) a sale in response to said user input.

37. A method as claimed in claim 34 wherein:
said dispensation data describes a duration during which said container was dispensing said bulk product; and
said method additionally comprises associating an expected dispensation rate (226) and an actual dispensation rate (224) with said container; and
said evaluating activity is conducted in response to said dispensation data and said expected dispensation rate.

38. A method as claimed in claim 37 wherein said method additionally comprises adjusting said actual dispensation rate (268) from time to time to improve accuracy of said actual dispensation rate.

39. A method as claimed in claim 34 wherein:
said dispensation of said bulk product from said container results from tilting said container away from an inactive orientation;
said dispensation-data-collecting activity comprises obtaining first data (146) which describe a first duration during which said container is tilted greater than a first angle (65) away from said inactive orientation and second data (148) which describe a second duration during which said container is tilted greater than a second angle (63) away from said inactive orientation, wherein said second angle is greater than said first angle; and
said evaluating activity uses said first and second data to determine whether the quantity dispensed was within said dispensing range.

40. A method as claimed in claim 39 additionally comprising: emitting a warning when said container spends greater than a predetermined duration at an angle between said first and second angles.

41. A method as claimed in claim 34 additionally comprising:
adjusting (256, 292) inventory data for said container in response to said dispensation data;
receiving (288) a request for inventory audit information about said container;
selecting one of a plurality of graphic images in response an identity of said container; and
providing said requested inventory audit information through an information-presentation system (196), said inventory audit information being configured to depict said one graphic image and to depict a product level (60) relative to said one graphic image, said product level being responsive to said inventory data for said container.

42. A method as claimed in claim 34 wherein said asset tag detects a plurality of events occurring at said container, wherein said user input is one of said events and said dispensation is another of said events, and said method additionally comprises:
transmitting (100) data describing at least a portion of said events from said asset tag to a remotely located computer;
determining (208), at said computer, whether one of said events occurring at said container was not described by said data; and
when said one event was not described by said data, presenting (210) information through said information-presentation system so that an audit of said one container may be performed, said information indicating that said one event was missed.

43. A method as claimed in claim 34 additionally comprising:
accumulating sales prices for a plurality of dispensations to produce an accumulated sales price value (284); and
presenting (286) said accumulated sales price value as humanly perceivable information so that an audit may be performed against actual revenue collected.

* * * * *